United States Patent
Kondapavuluru et al.

(10) Patent No.: US 12,177,187 B2
(45) Date of Patent: *Dec. 24, 2024

(54) EFFICIENT ENCRYPTION AND DECRYPTION OF DUPLICATE PACKETS COMMUNICATED VIA A VIRTUAL PRIVATE NETWORK

(71) Applicant: Juniper Networks, Inc., Sunnyvale, CA (US)

(72) Inventors: Goutham Kondapavuluru, Bangalore (IN); Sarvesh K. Batta, Bangalore (IN); Vijay Sai Ram Paruchuri, Bangalore (IN); Ramesh Biradar, Bangalore (IN); Sharanagoud B Devaraddi, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,995

(22) Filed: Dec. 23, 2022

(65) Prior Publication Data

US 2023/0127468 A1  Apr. 27, 2023

Related U.S. Application Data

(63) Continuation of application No. 16/902,458, filed on Jun. 16, 2020, now Pat. No. 11,575,653.

(30) Foreign Application Priority Data

May 4, 2020 (IN) .............................. 202041018890

(51) Int. Cl.
*H04L 9/40* (2022.01)
*H04L 9/08* (2006.01)
*H04L 69/22* (2022.01)

(52) U.S. Cl.
CPC ........ *H04L 63/0272* (2013.01); *H04L 9/0819* (2013.01); *H04L 63/0428* (2013.01); *H04L 63/164* (2013.01); *H04L 69/22* (2013.01)

(58) Field of Classification Search
CPC ... H04L 41/0893; H04L 12/2854; H04L 9/40; H04L 9/0819; H04L 63/164; H04L 63/0272; H04L 29/06
See application file for complete search history.

(56) References Cited

U.S. PATENT DOCUMENTS

| 7,657,737 B2 | 2/2010 | Klein et al. |
| 10,558,446 B2 | 2/2020 | Wright |

(Continued)

FOREIGN PATENT DOCUMENTS

| CN | 101107812 A | 1/2008 |
| CN | 104981784 A | 10/2015 |

(Continued)

OTHER PUBLICATIONS

Extended European Search Report for Application No. EP21167922.0, mailed on Sep. 23, 2021, 9 pages.

*Primary Examiner* — Iqbal Zaidi
(74) *Attorney, Agent, or Firm* — Harrity & Harrity, LLP

(57) ABSTRACT

A network device may create an encrypted packet and may duplicate the encrypted packet to create a plurality of encrypted packets that includes a first set of encrypted packets that is associated with a first receiving network device and a second set of encrypted packets that is to be associated with a second receiving network device. The network device may modify the second set of encrypted packets by replacing a first virtual destination address in the second set of the plurality of encrypted packets with a second virtual destination address that identifies a virtual tunnel endpoint of the second receiving network device. The network device may encapsulate and may send, based on the (Continued)

first virtual destination address and the second virtual destination address, individual encapsulated encrypted packets to the first receiving network device or the second receiving network device.

20 Claims, 21 Drawing Sheets

(56) References Cited

U.S. PATENT DOCUMENTS

| | | |
|---|---|---|
| 11,233,778 B2 | 1/2022 | Abraham et al. |
| 2003/0147403 A1 | 8/2003 | Border et al. |
| 2013/0170502 A1* | 7/2013 | Chen .................. H04L 12/4641 370/401 |
| 2013/0308597 A1* | 11/2013 | Murphy ............. H04L 12/4641 370/331 |
| 2016/0315920 A1* | 10/2016 | Kurmala ............ H04L 63/0471 |
| 2017/0346731 A1 | 11/2017 | Pukhraj Jain et al. |
| 2019/0132297 A1 | 5/2019 | Ammanur et al. |
| 2019/0372936 A1 | 12/2019 | Sullenberger et al. |
| 2021/0344650 A1 | 11/2021 | Kondapavuluru et al. |
| 2021/0352047 A1* | 11/2021 | Singh .................. H04L 61/2592 |

FOREIGN PATENT DOCUMENTS

| | | |
|---|---|---|
| CN | 110838975 A | 2/2020 |
| EP | 3869746 A1 | 8/2021 |

\* cited by examiner

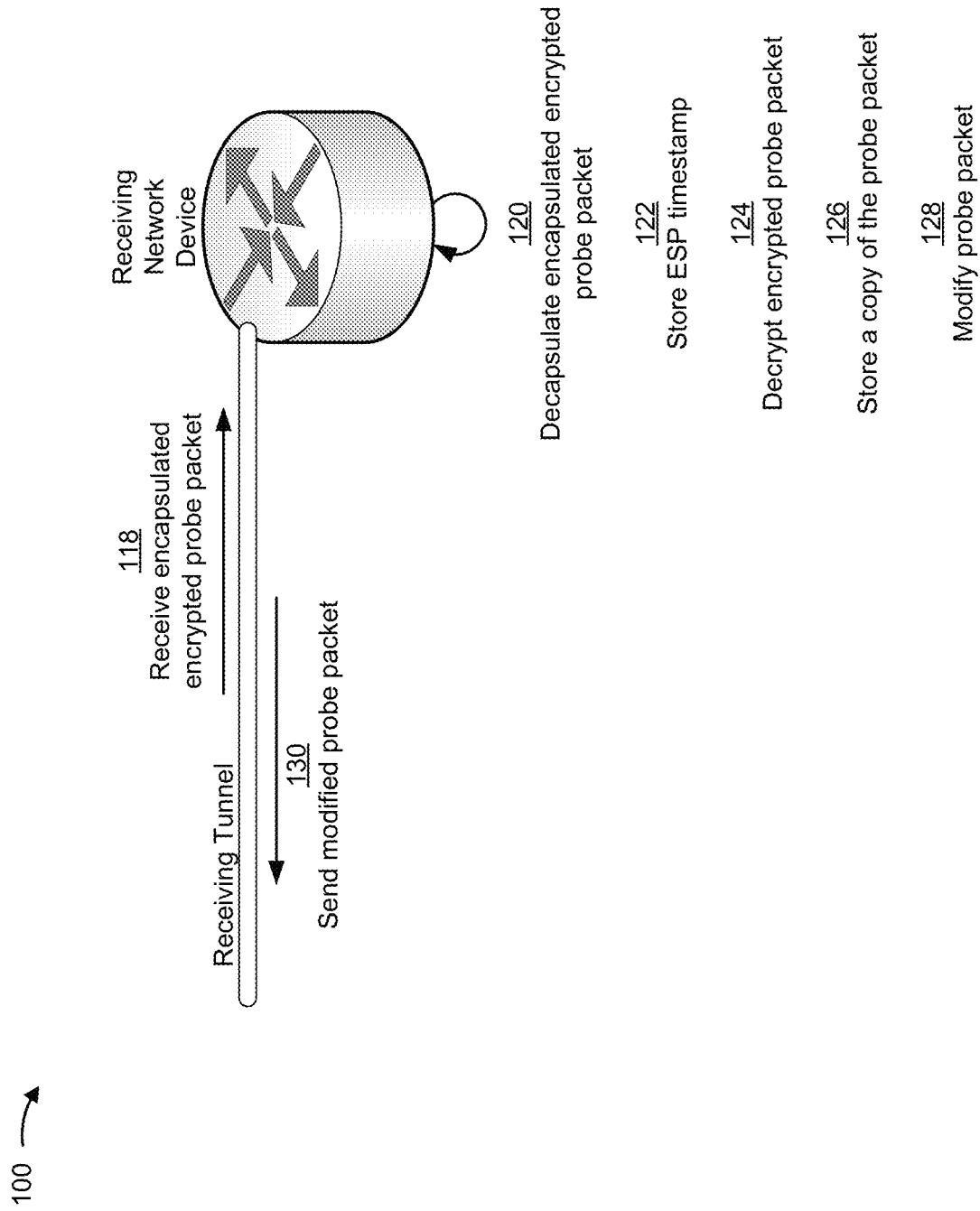

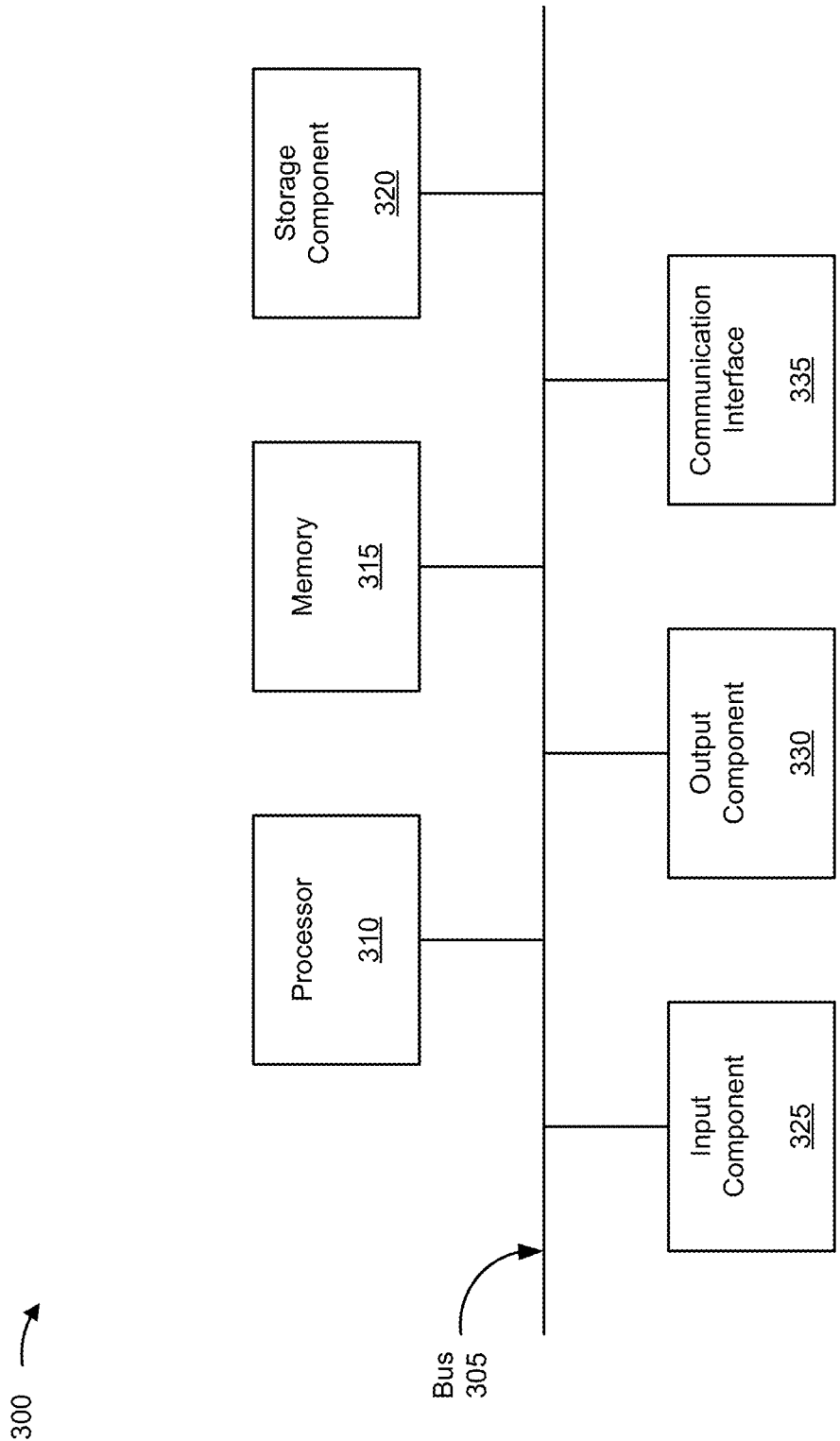

EFFICIENT ENCRYPTION AND DECRYPTION OF DUPLICATE PACKETS COMMUNICATED VIA A VIRTUAL PRIVATE NETWORK

CROSS-REFERENCE TO RELATED APPLICATION

This application is a continuation of U.S. patent application Ser. No. 16/902,458, filed Jun. 16, 2020, which claims priority to India Patent Application No. 202041018890, entitled "EFFICIENT ENCRYPTION AND DECRYPTION OF DUPLICATE PACKETS COMMUNICATED VIA A VIRTUAL PRIVATE NETWORK," filed on May 4, 2020, the contents of which are incorporated herein by reference in their entireties.

BACKGROUND

A network tunnel is a mechanism for secure transmission of private information through a public network in such a way that network devices of the public network are unaware of the private information. A tunneling protocol is a communications protocol that enables creation of a network tunnel. The tunneling protocol enables private information to be sent across a public network through a process called encapsulation.

SUMMARY

According to some implementations, a method may include receiving, by a network device, an encryption key for packet encryption associated with a virtual private network (VPN), wherein the encryption key is associated with a decryption key that is used by a plurality of network devices of the VPN for packet decryption; encrypting, by the network device and using the key, a packet to create an encrypted packet, wherein the encrypted packet includes an outer internet protocol (IP) header that includes a virtual source address that identifies a virtual tunnel endpoint of the network device and a first virtual destination address that identifies a virtual tunnel endpoint of a first receiving network device; duplicating the encrypted packet to create a plurality of encrypted packets that includes a first set of encrypted packets that is associated with the first receiving network device and a second set of encrypted packets that is to be associated with a second receiving network device; replacing the first virtual destination address in the second set of the plurality of encrypted packets with a second virtual destination address that identifies a virtual tunnel endpoint of the second receiving network device; encapsulating, based on a tunneling protocol, the first set of encrypted packets to create a first set of encapsulated encrypted packets, wherein individual encapsulated encrypted packets of the first set of encapsulated encrypted packets include an additional outer IP header that includes a physical source address that identifies a physical tunnel endpoint of the network device and a physical destination address that identifies a physical tunnel endpoint of the first receiving network device; encapsulating, based on the tunneling protocol, the second set of encrypted packets to create a second set of encapsulated encrypted packets, wherein individual encapsulated encrypted packets of the second set of encapsulated encrypted packets include an additional outer IP header that includes a physical source address that identifies a physical tunnel endpoint of the network device and a physical destination address that identifies a physical tunnel endpoint of the second receiving network device; sending the individual encapsulated encrypted packets of the first set of encapsulated encrypted packets to the first receiving network device via individual designated tunnels of a first plurality of tunnels between the network device and the first receiving network device; and sending the individual encapsulated encrypted packets of the second set of encapsulated encrypted packets to the second receiving network device via individual designated tunnels of a second plurality of tunnels between the network device and the second receiving network device.

According to some implementations, a network device may include one or more memories and one or more processors to: receive a decryption key for packet decryption associated with a VPN, wherein the decryption key is associated with an encryption key that is used by a plurality of network devices of the VPN for packet encryption; receive, from a transmitting network device, a packet via a tunnel, of a plurality of tunnels between the network device and the transmitting network device, wherein the packet includes a first outer IP header, a Generic Routing Encapsulation (GRE) header, a second outer IP header, an Encapsulating Security Payload (ESP) header associated with an encryption of an inner packet of the packet, and the inner packet, wherein the inner packet is encapsulated by the ESP header, the ESP header is encapsulated by the second outer IP header, the second outer IP header is encapsulated by the GRE header, and the GRE header is encapsulated by the first outer IP header; decapsulate the packet to remove the first outer IP header and the GRE header from the packet to identify: an ESP timestamp associated with the ESP header, and a virtual source address of a virtual tunnel endpoint of the tunnel at the transmitting network device; decrypt the packet to identify the inner packet; and perform, based on the ESP timestamp, an action associated with the inner packet.

According to some implementations, a non-transitory computer-readable medium may store one or more instructions. The one or more instructions, when executed by one or more processors of a network device, may cause the one or more processors to: receive an encryption key for packet encryption associated with a VPN, wherein the encryption key is associated with a decryption key that is used by a plurality of network devices of the VPN for packet decryption; encrypt, using the key, a packet to create an encrypted packet, wherein the encrypted packet includes an outer IP header that includes a virtual source address that identifies a virtual tunnel endpoint of the network device and a first virtual destination address that identifies a virtual tunnel endpoint of a first receiving network device; duplicate the encrypted packet to create a plurality of encrypted packets that includes a first set of encrypted packets that is associated with the first receiving network device and a second set of encrypted packets that is to be associated with a second receiving network device; modify the second set of encrypted packets by replacing the first virtual destination address in the second set of the plurality of encrypted packets with a second virtual destination address that identifies a virtual tunnel endpoint of the second receiving network device; encapsulate, based on a tunneling protocol, the first set of encrypted packets and the second set of encrypted packets to create a plurality of encapsulated encrypted packets; and send, based on the first virtual destination address and the second virtual destination address, individual encapsulated encrypted packets of the plurality of encapsulated encrypted packets to the first receiving network device or the second receiving network device.

BRIEF DESCRIPTION OF THE DRAWINGS

FIGS. 3A and 3B are diagrams of example components of one or more devices of FIG. 2.

DETAILED DESCRIPTION

Figure 1A:
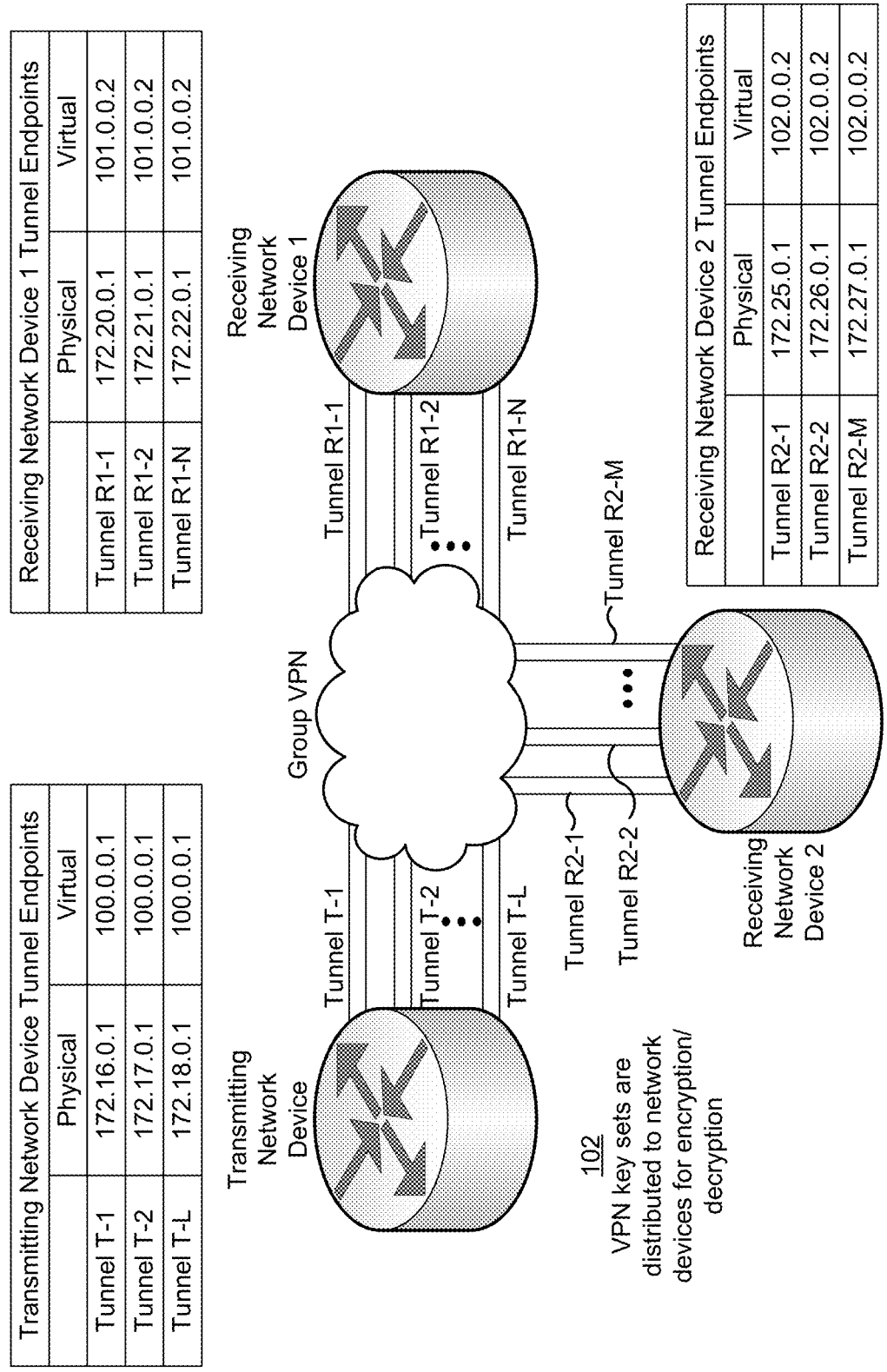
FIGS. 1A-1N are diagrams of one or more example implementations described herein.

The following detailed description of example implementations refers to the accompanying drawings. The same reference numbers in different drawings may identify the same or similar elements.

In some situations, it may be beneficial to use a plurality of tunnels to connect a transmitting network device to a plurality of receiving network devices (e.g., where a set of tunnels, of the plurality of tunnels, connect the transmitting network device to a particular receiving network device of the plurality of receiving network devices). In some cases, the transmitting network device may be configured to send a plurality of copies of the same packet to each of the plurality of receiving network devices. For example, the transmitting network device may send individual copies of probe packets (e.g., packets used to determine a status, a performance, and/or the like of the plurality of tunnels) to a receiving network device via each tunnel of a set of tunnels associated with the receiving network device.

In some cases, the transmitting network device may encrypt a packet, using an encryption protocol, such as an Encapsulating Security Payload (ESP) protocol, and may duplicate the encrypted packet to send copies of the encrypted packet to a receiving network device via a set of tunnels associated with the receiving network device. To send an encrypted version of the packet to each receiving network device, however, the transmitting network device performs a separate encryption process on the packet to create an encrypted packet for each receiving network device. This wastes computing resources (e.g., processing resources, memory resources, power resources, and/or the like) of the transmitting network device to encrypt the same packet multiple times.

According to some implementations, a transmitting network device may encrypt a packet to create an encrypted packet, wherein the encrypted packet includes an outer IP header that includes a virtual source address that identifies a virtual tunnel endpoint of the transmitting network device and a first virtual destination address that identifies a virtual tunnel endpoint of a first receiving network device. The transmitting network device may duplicate the encrypted packet to create a plurality of encrypted packets that includes a first set of encrypted packets that is associated with the first receiving network device and a second set of encrypted packets that is to be associated with a second receiving network device. The transmitting network device may modify the second set of encrypted packets by replacing the first virtual destination address in the second set of the plurality of encrypted packets with a second virtual destination address that identifies a virtual tunnel endpoint of the second receiving network device. The transmitting network device may send, based on the first virtual destination address and the second virtual destination address, individual encrypted packets of the first set of encrypted packets to the first receiving network device and individual encrypted packets of the second set of encrypted packets to the second receiving network device.

In this way, the transmitting network device performs only one encryption process to encrypt a packet that can be duplicated, modified, and sent to a plurality of receiving network devices rather than performing an encryption process to encrypt the packet for each receiving network device of the plurality of receiving network devices. Moreover, a receiving network device can decrypt just one of the copies of the encrypted packet that the receiving network device receives (e.g., to process the packet and discard and/or ignore other copies of the packet). Thus, some implementations described herein eliminate unnecessary encryption and decryption processes by the transmitting network device and the receiving network device, and therefore conserve computing resources (e.g., processing resources, memory resources, power resources, and/or the like) of the transmitting network device and the receiving network device that would otherwise be wasted performing the unnecessary encryption and decryption processes.

Figure 1B:
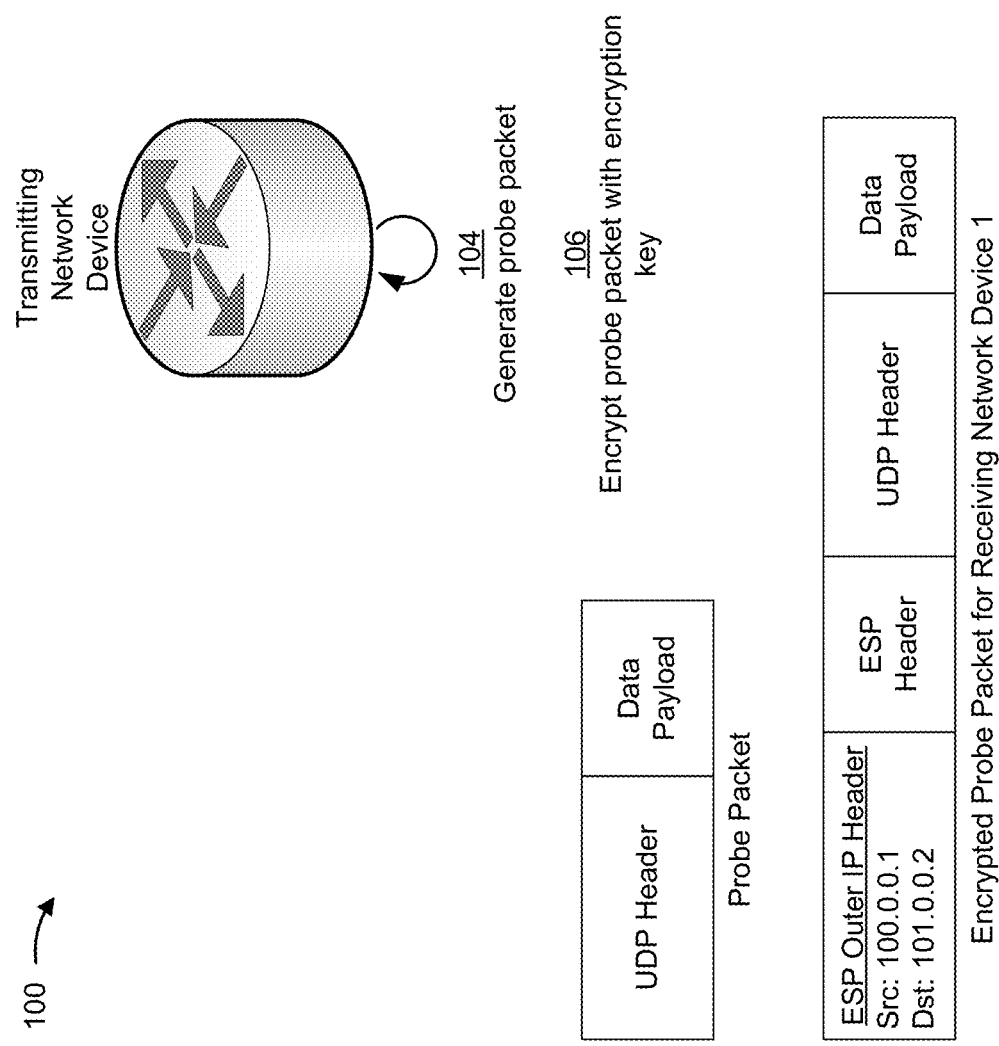
Figure 1C:
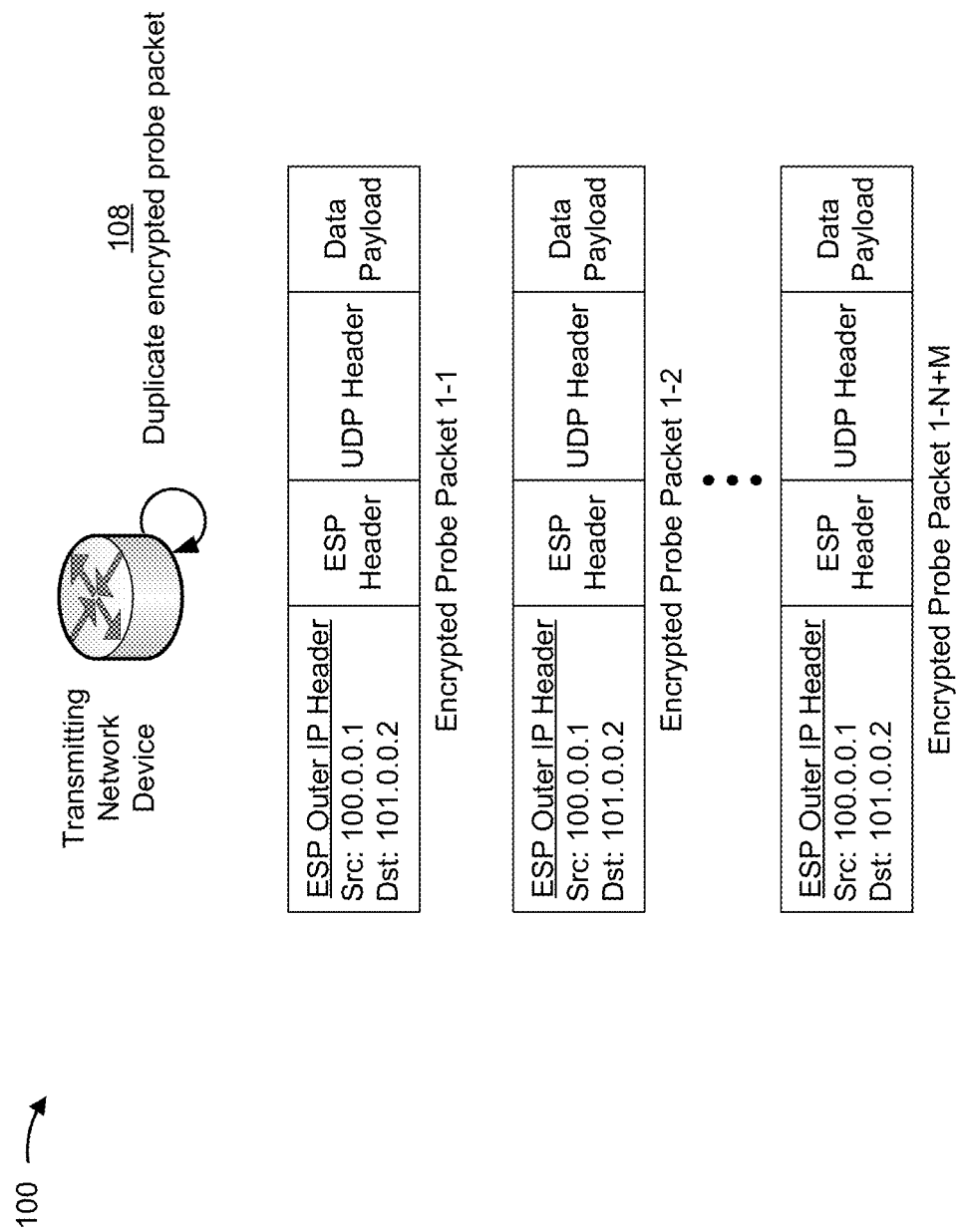
Figure 1D:
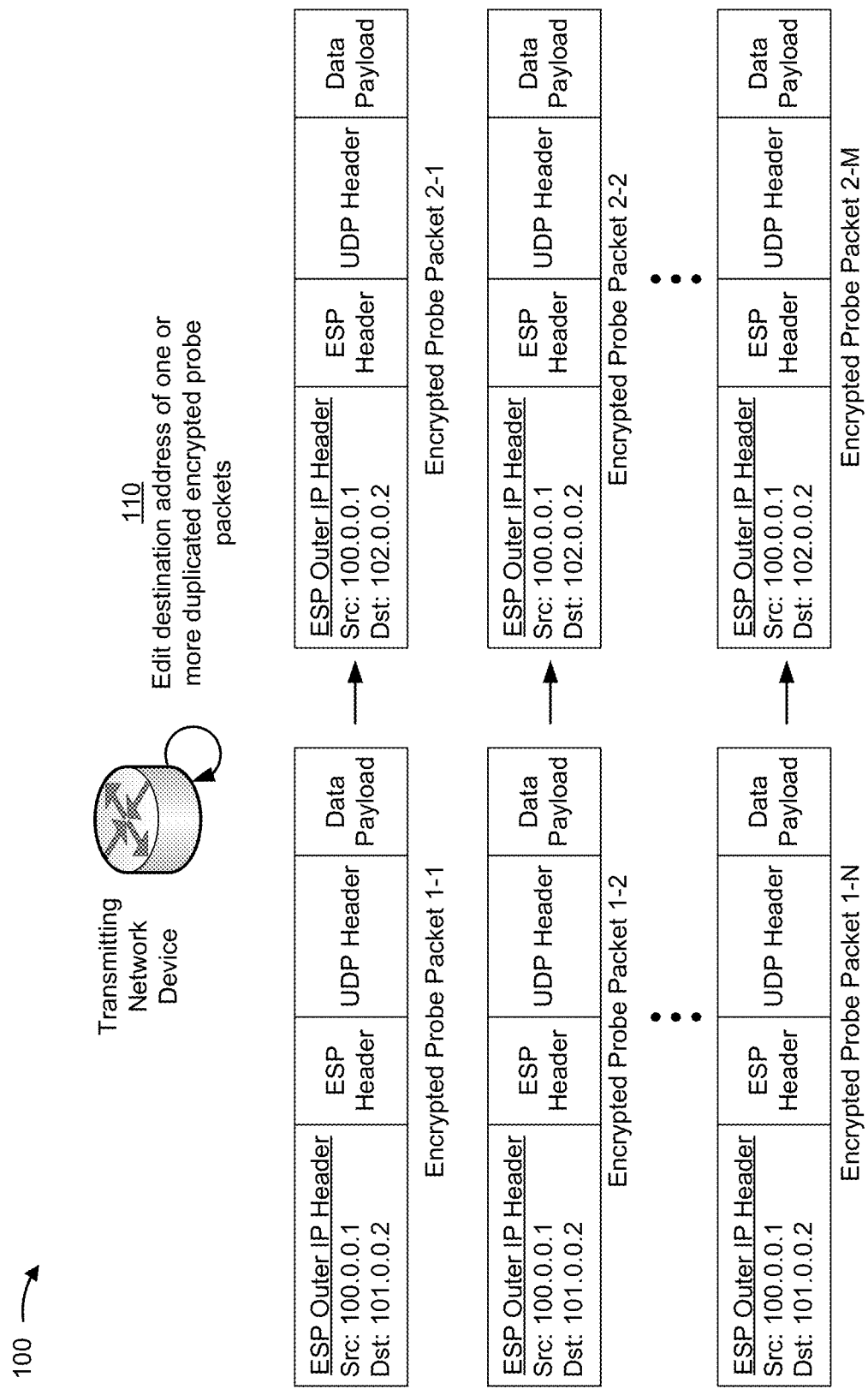
Figure 1E:
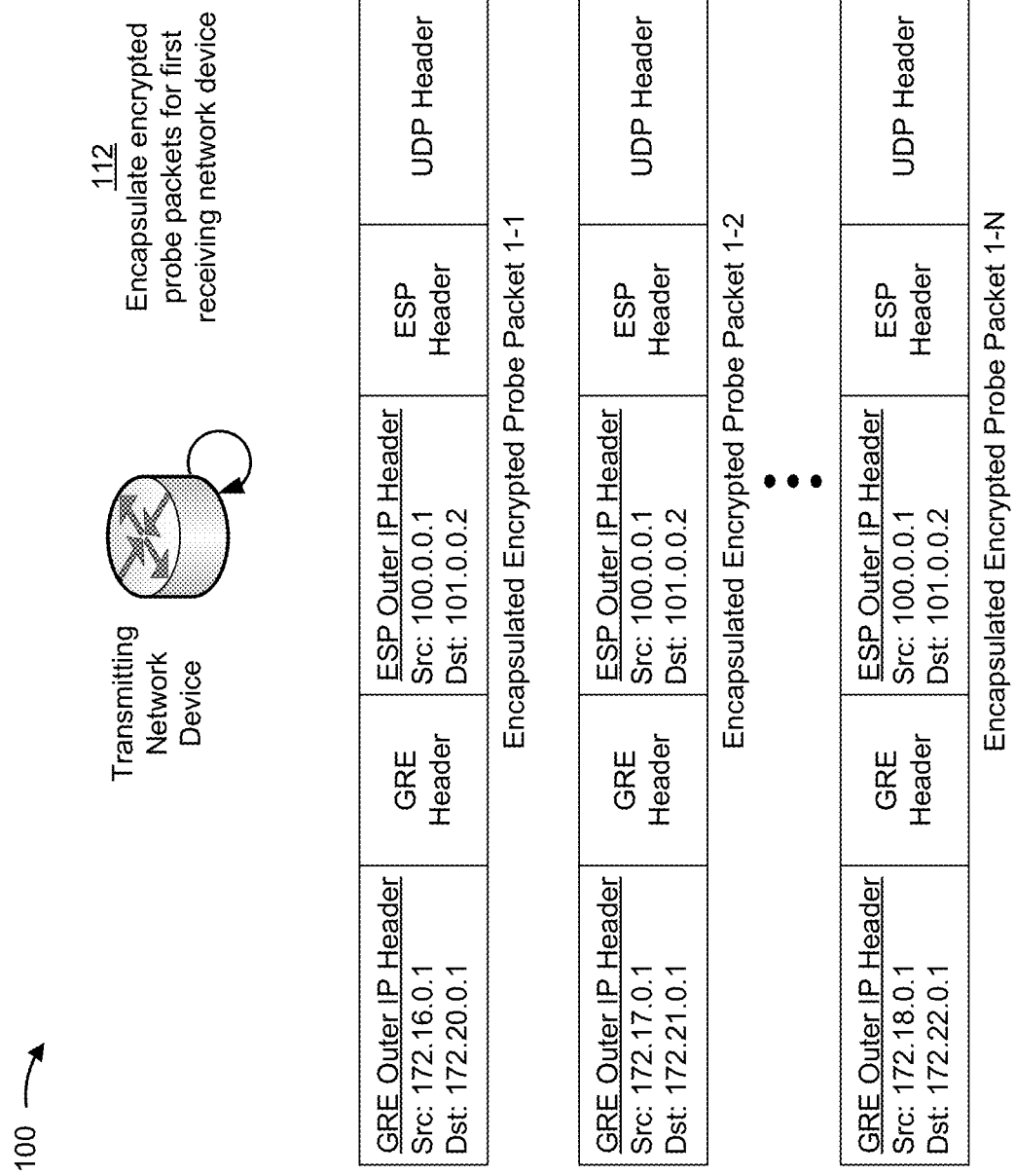
Figure 1F:
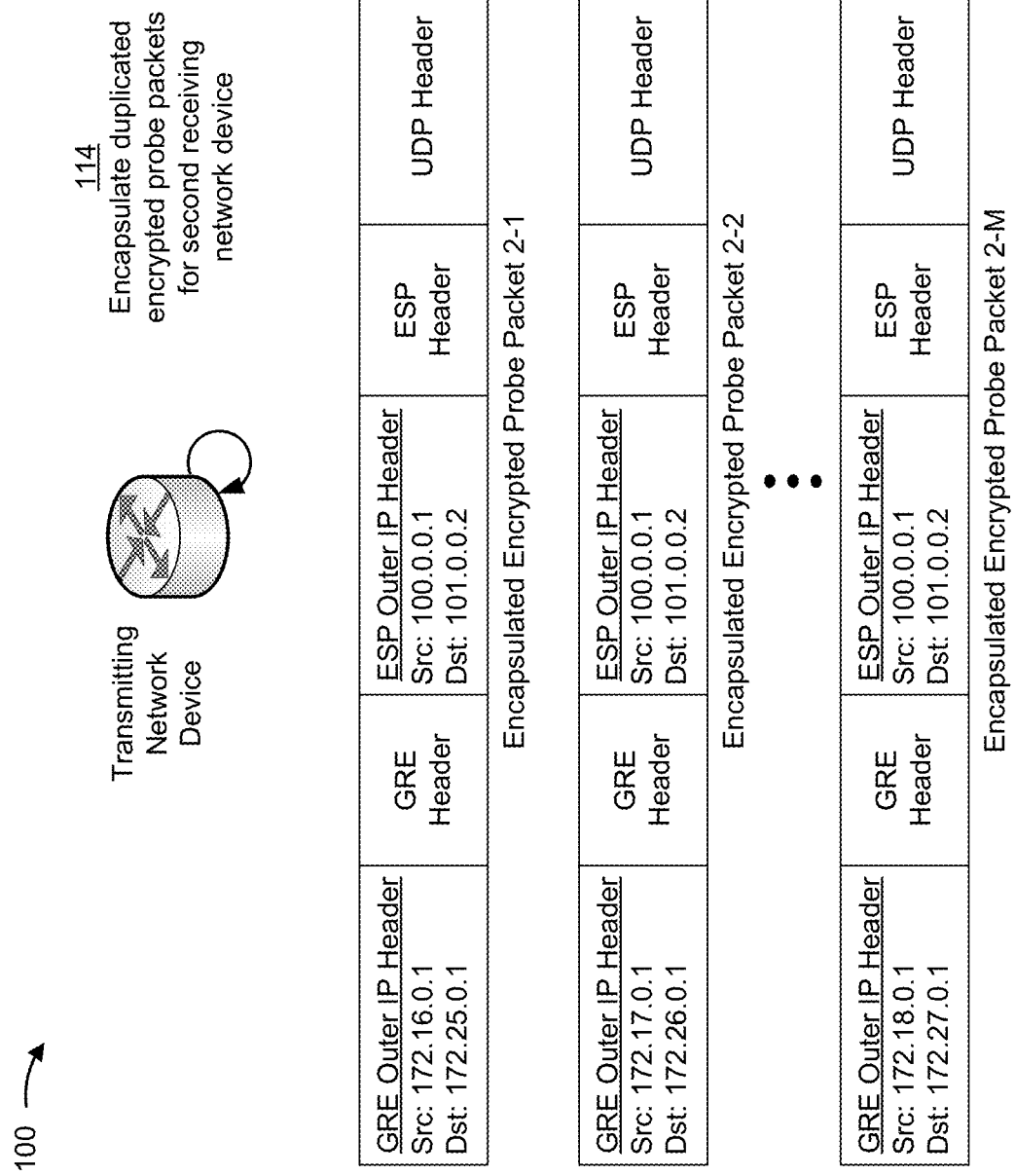
Figure 1G:
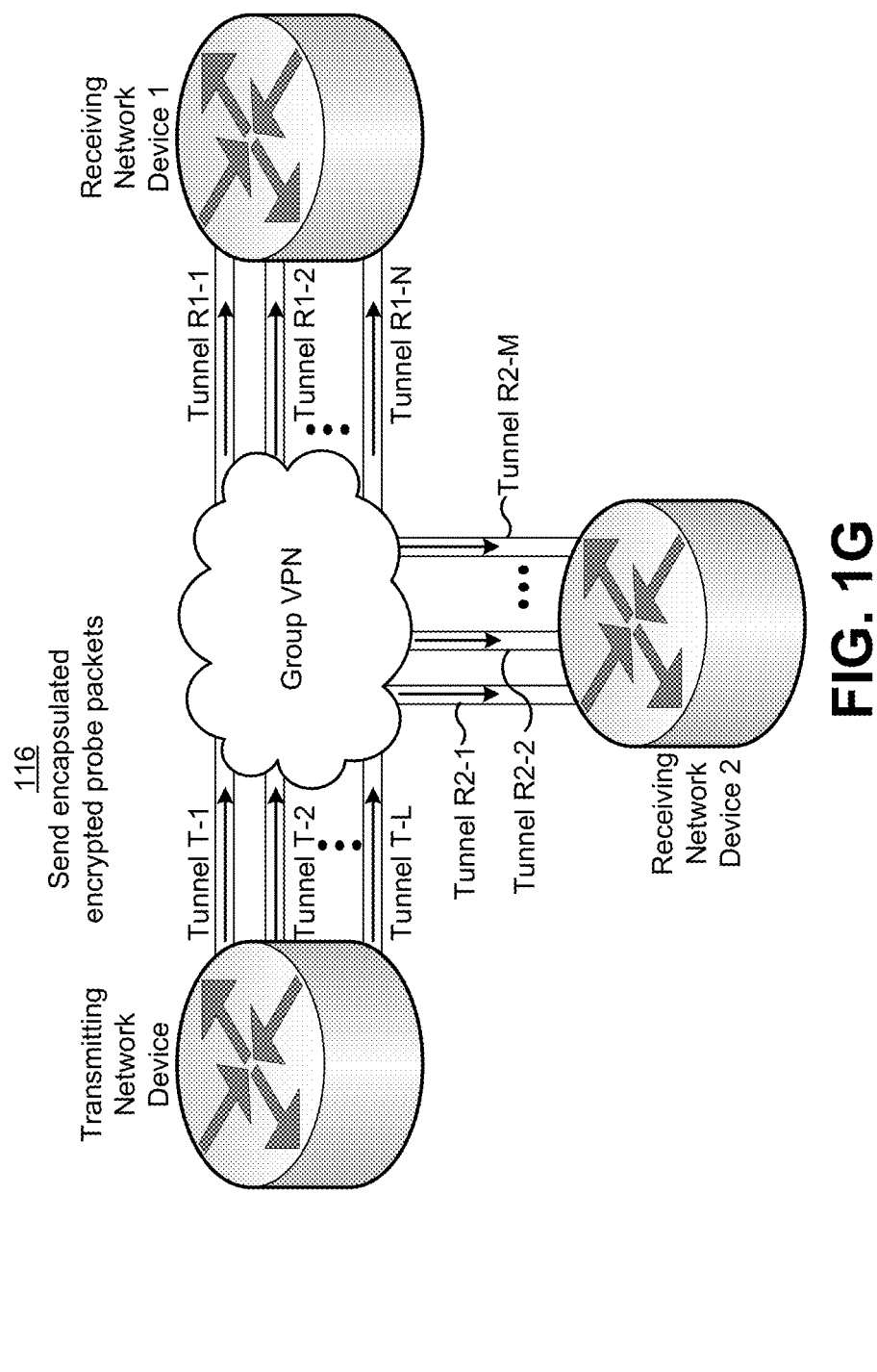
Figure 1I:
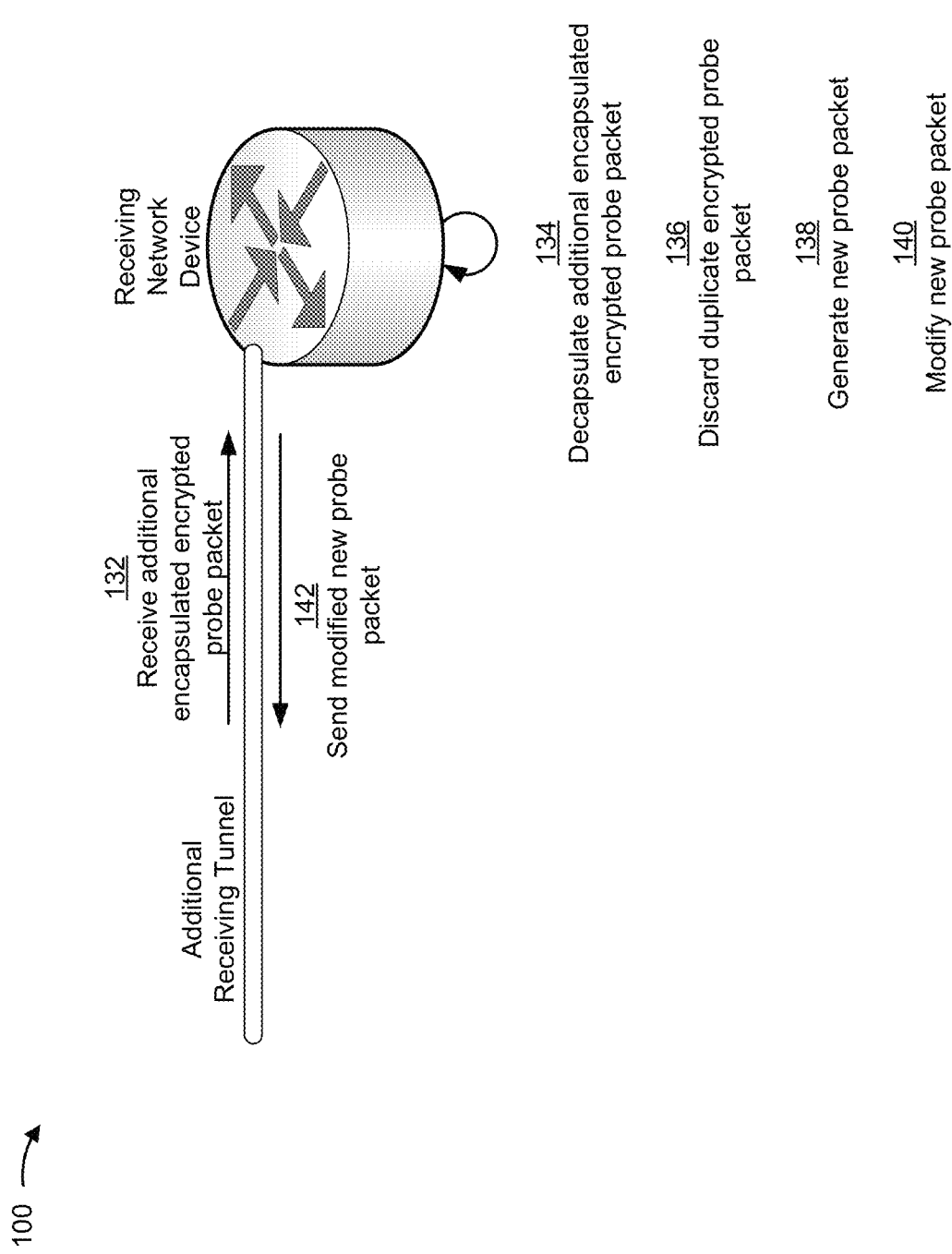
Figure 1J:
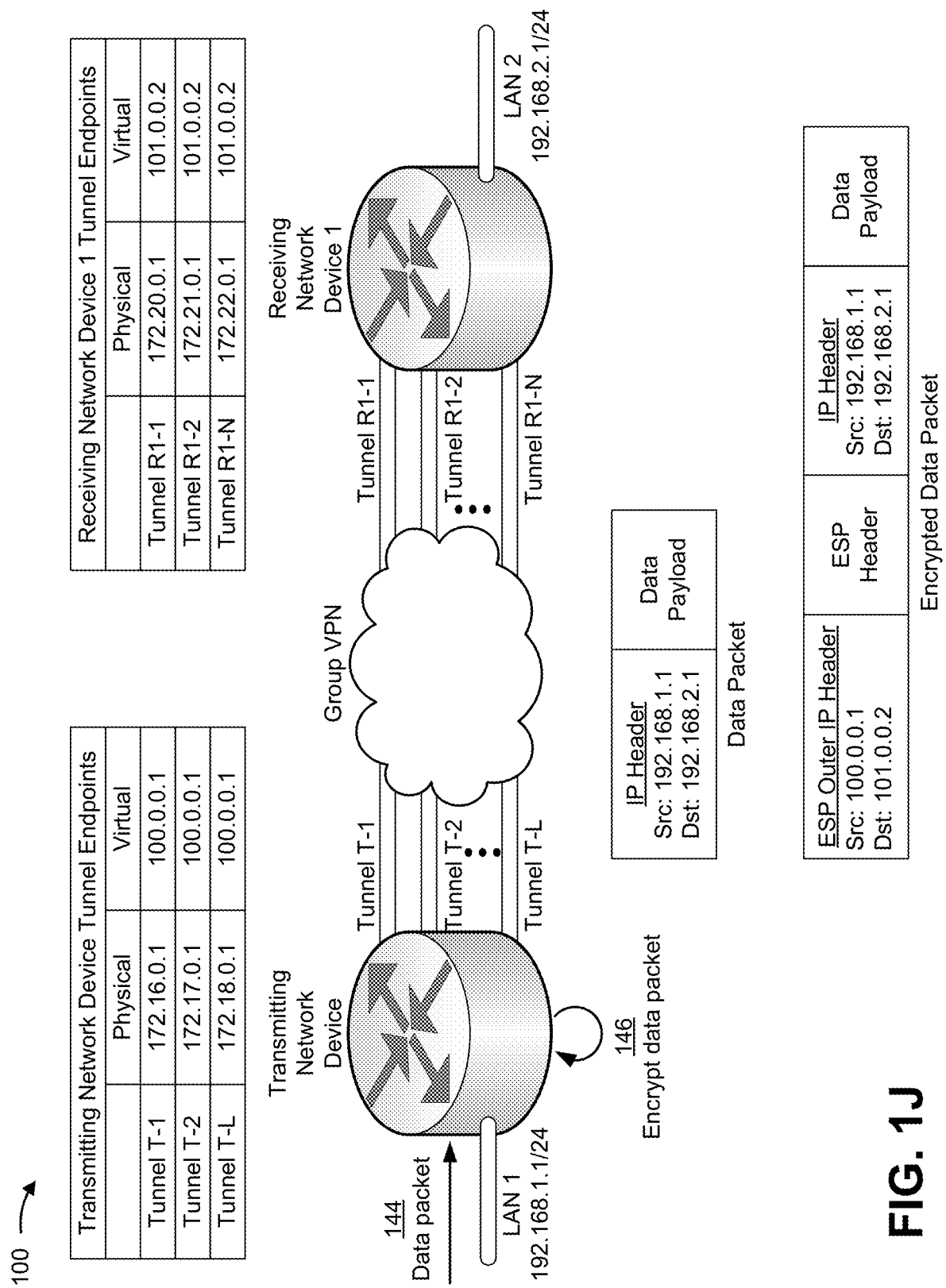
Figure 1K:
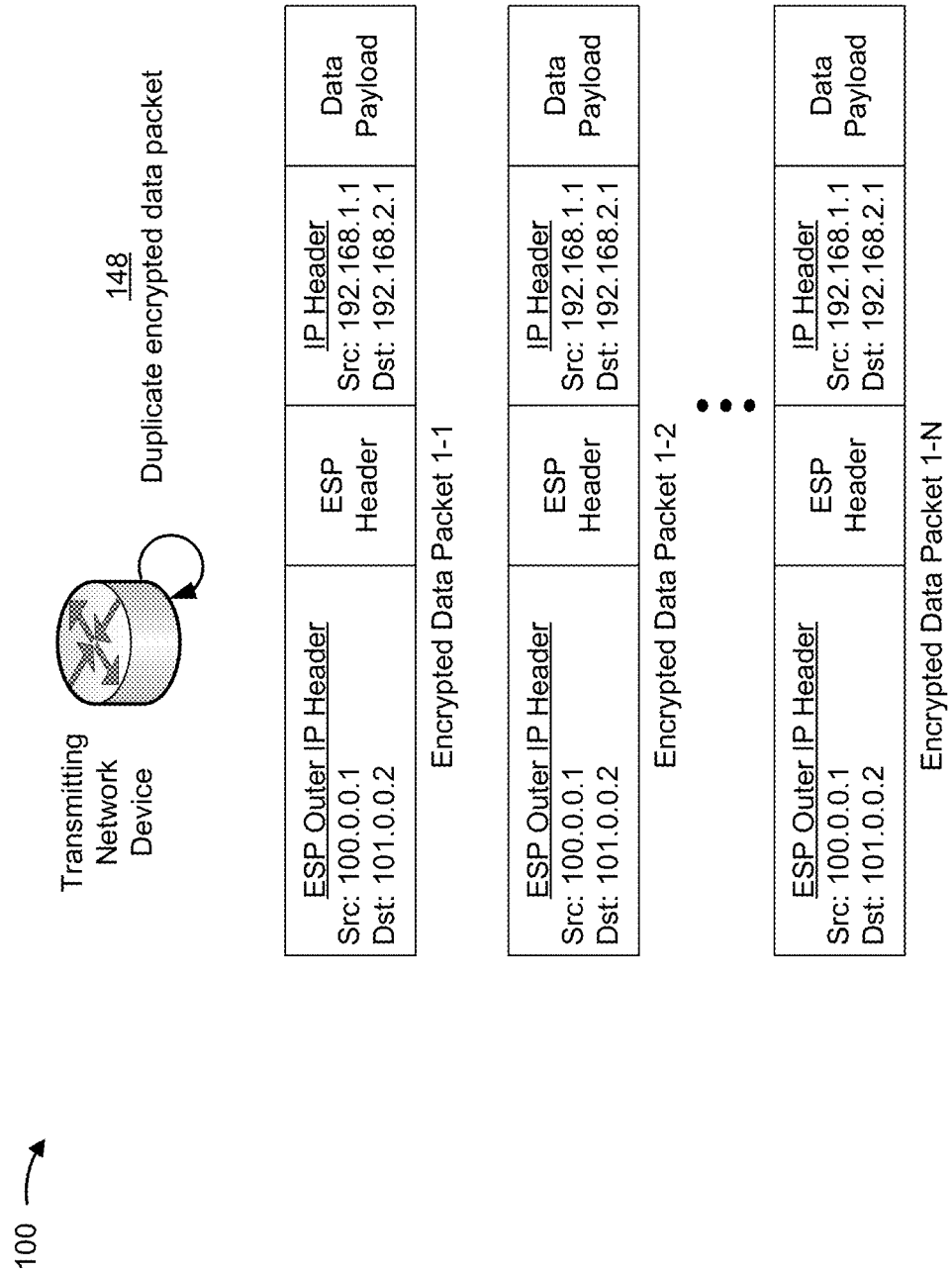
Figure 1L:
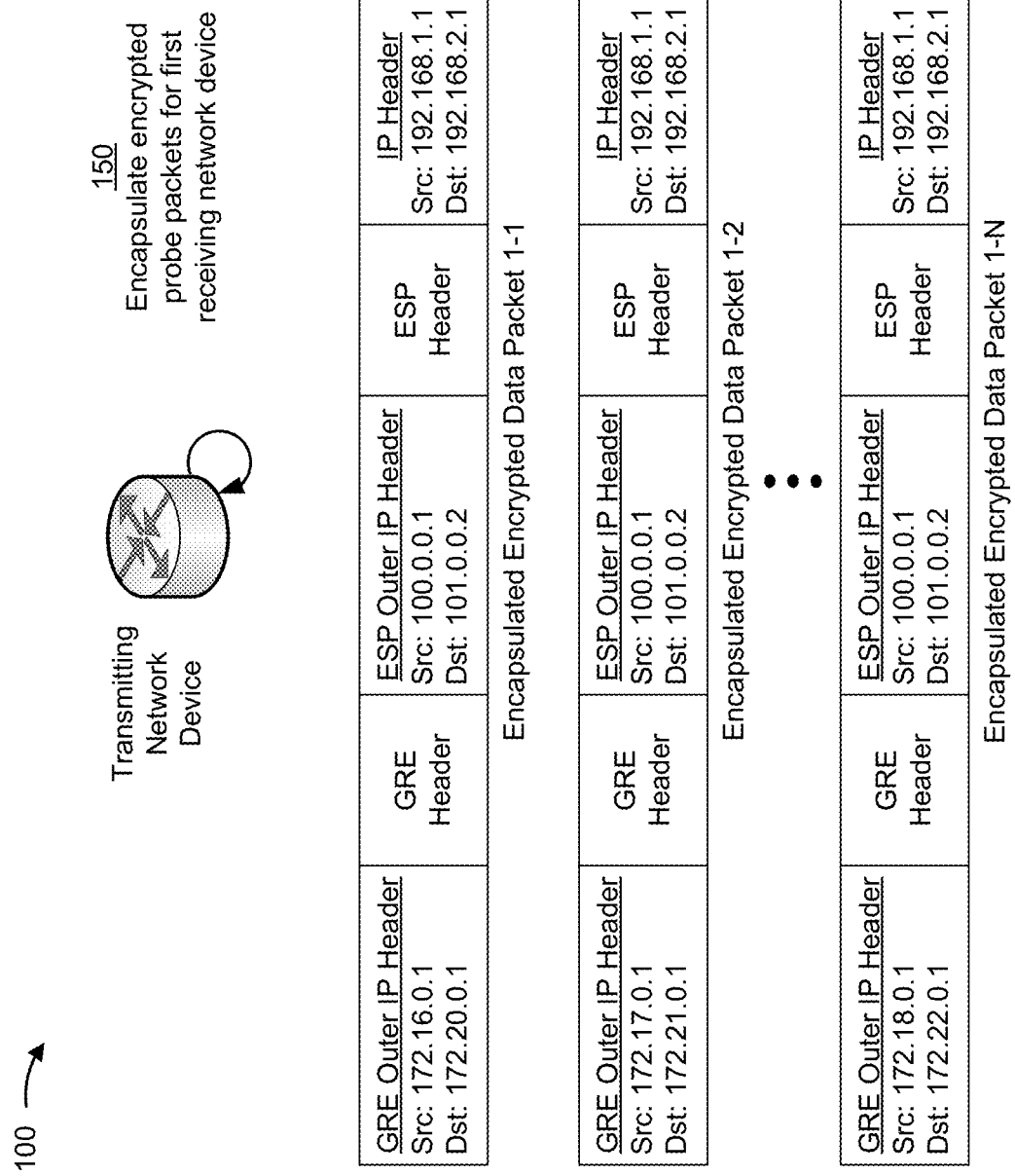
Figure 1M:
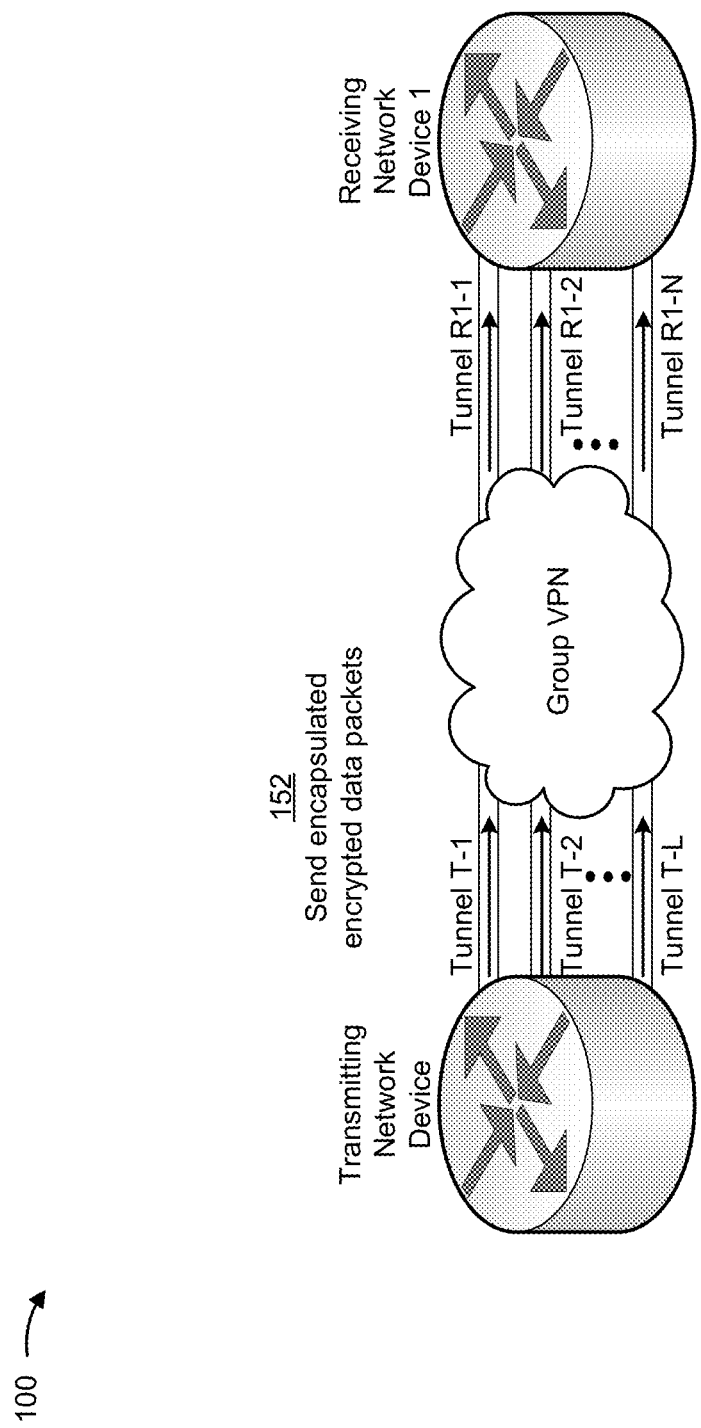
Figure 1N:
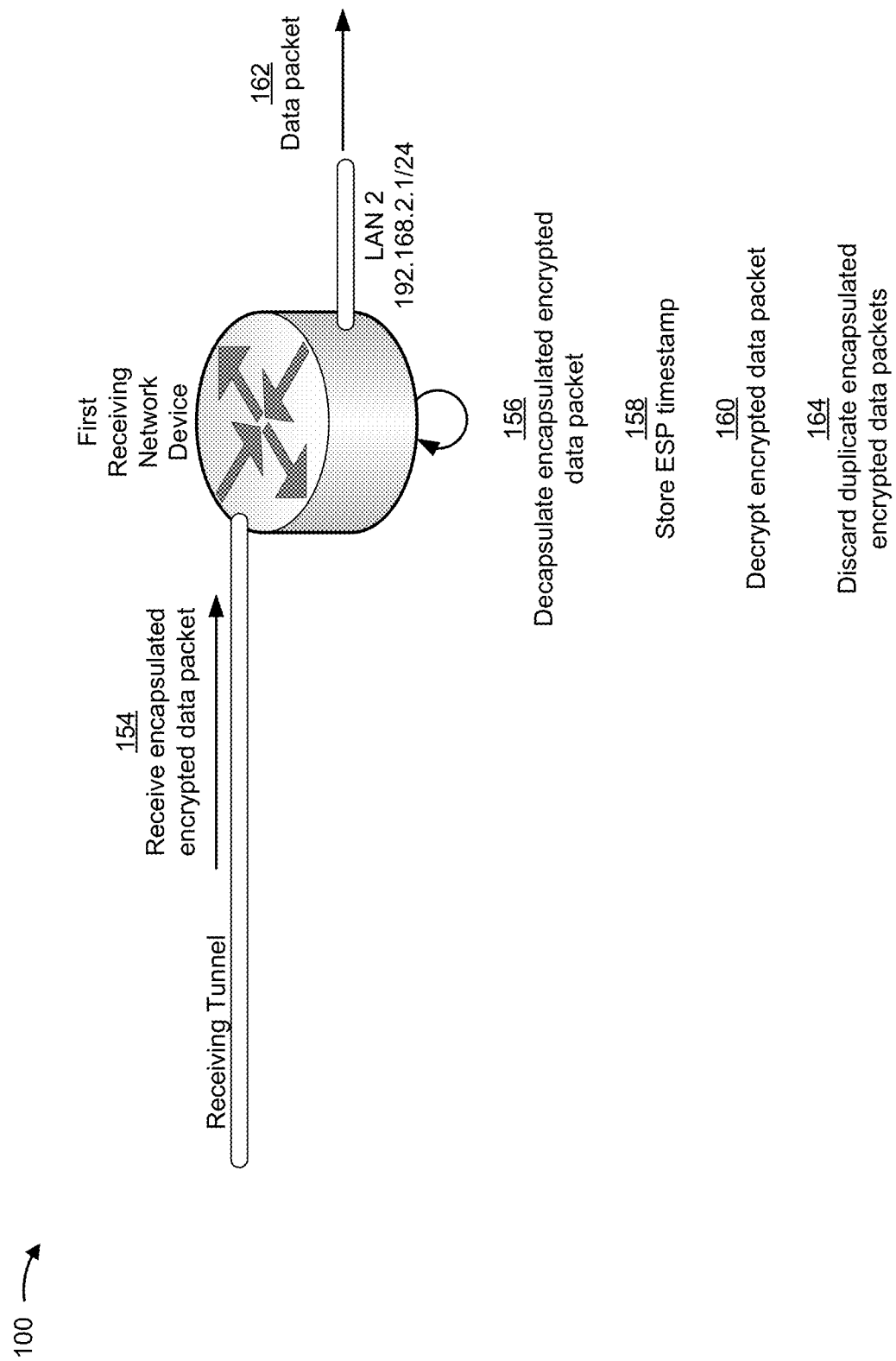

FIGS. 1A-1N are diagrams of one or more example implementations 100 described herein. As shown in FIGS. 1A-1N, example implementation(s) 100 may include a transmitting network device, a first receiving network device (shown as receiving network device 1), and a second receiving network device (shown as receiving network device 2). As shown in FIG. 1A, the transmitting network device, the first receiving network device, and the second receiving network device may be connected to form a VPN, such as a group VPN. Each network device may be connected to the group VPN via a plurality of respective point-to-point connections, such as a plurality of network tunnels (e.g., Generic Routing Encapsulation (GRE) tunnels). For example, as shown in FIG. 1A, tunnels T-1 through T-L (where L is greater than or equal to 2) connect the transmitting network device to the group VPN; tunnels R1-1 through R1-N (where N is greater than or equal to 2) connect the first receiving network device to the group VPN; and tunnels R2-1 through R2-M (where M is greater than or equal to 2) connect the second receiving network device to the group VPN. While example tunnels are described herein in reference to tunnels that conform to the GRE tunneling protocol, implementations described herein also apply to other tunneling protocols. Also, while the transmitting network device, the first receiving network device, and the second receiving network device are shown as connecting to the group VPN via multiple tunnels, it is possible for one or more of the transmitting network device, the first receiving network device, or the second receiving network device to connect to the group VPN via a single tunnel. Further, the group VPN is shown as having three network devices for ease of explanation. In practice, the group VPN may have a greater number of network devices than three.

Each tunnel may have a plurality of tunnel endpoints associated with the network device that the tunnel connects to the group VPN. In some implementations, a tunnel may have a physical tunnel endpoint (e.g., a physical IP address) associated with the network device. For example, as shown in FIG. 1A, tunnel T-1 has a physical tunnel endpoint (e.g., 172.16.0.1) associated with the transmitting network device, tunnel T-2 has a physical tunnel endpoint (e.g., 172.17.0.1) associated with the transmitting network device, and tunnel T-L has a physical tunnel endpoint (e.g., 172.18.0.1) associated with the transmitting network device; tunnel R1-1 has a physical tunnel endpoint (e.g., 172.20.0.1) associated with the first receiving network device, tunnel R1-2 has a physical tunnel endpoint (e.g., 172.21.0.1) associated with the first receiving network device, and tunnel R1-N has a physical tunnel endpoint (e.g., 172.22.0.1) associated with the first receiving network device; and tunnel R2-1 has a physical tunnel endpoint (e.g., 172.25.0.1) associated with the second receiving network device, tunnel R2-2 has a physical tunnel endpoint (e.g., 172.26.0.1) associated with the second receiving network device, and tunnel R2-M has a physical tunnel endpoint (e.g., 172.27.0.1) associated with the second receiving network device.

Additionally, or alternatively, each tunnel may have a virtual tunnel endpoint (e.g., a virtual IP address, such as for a loopback (LO) interface) associated with the network device that the tunnel connects to the group VPN. The virtual tunnel endpoint may be the same for each tunnel associated with a network device. For example, as shown in FIG. 1A, tunnels T-1 through T-L have the same virtual tunnel endpoint (e.g., 100.0.0.1) associated with the transmitting network device; tunnels R1-1 through R1-N have the same virtual tunnel endpoint (e.g., 101.0.0.2) associated with the first receiving network device; and tunnels R2-1 through R2-M have the same virtual tunnel endpoint (e.g., 102.0.0.2) associated with the second receiving network device.

As shown by reference number 102, a VPN key server of the group VPN may distribute (e.g., according to a group VPN protocol) the same VPN key set to the transmitting network device, the first receiving network device, and the second receiving network device. The VPN key set may include an encryption key for packet encryption associated with the group VPN and/or a decryption key for packet decryption associated with the group VPN. In this way, the transmitting network device, the first receiving network device, and the second receiving network device may each receive the same encryption key and/or decryption key. In some implementations, the encryption key and/or the decryption key may include a combination of a public key and a private key or some other type of encryption key and/or decryption key.

As shown in FIG. 1B and by reference number 104, the transmitting network device may generate a probe packet. The probe packet may be a multi-destination probe packet that is to be transmitted to all network devices in the group VPN (or a subset of the network devices in the group VPN). The probe packet may include a synthesized data payload and a user datagram protocol (UDP) header. The synthesized data payload may include synthesized data to approximate a size and/or content of a data payload of a data packet. The UDP header may designate a particular port (e.g., port 3600) to indicate that the probe packet is a probe packet (e.g., to be sent to the receiving network devices and routed back to the transmitting network device).

As shown by reference number 106, the transmitting network device may encrypt (e.g., using the encryption key from the VPN key set) the probe packet to create an encrypted probe packet (e.g., for the first receiving network device, as shown in FIG. 1B). For example, the transmitting network device may encrypt the probe packet using an Encapsulating Security Payload (ESP) protocol, which may cause the probe packet to be encapsulated with an ESP header. Additionally, or alternatively, the transmitting network device may encapsulate the encrypted probe packet with an outer IP header (e.g., an ESP outer IP header) that includes a source address that identifies the virtual tunnel endpoint of the transmitting network device (e.g., 100.0.0.1, as shown in FIG. 1A) and/or a destination address that identifies the virtual tunnel endpoint of the first receiving network device (e.g., 101.0.0.2, as shown in FIG. 1A). Accordingly, as shown in FIG. 1B, the transmitting network device may create an encrypted probe packet that includes an inner packet (e.g., the probe packet that includes the synthesized data payload and the UDP header) that is encapsulated by an ESP header, which is encapsulated by the ESP outer IP header.

As shown in FIG. 1C and by reference number 108, the transmitting network device may duplicate the encrypted probe packet to create a plurality of encrypted probe packets (shown in FIG. 1C as encrypted probe packets 1-1 through 1-N+M). For example, the transmitting network device may determine that N tunnels connect the first receiving network device to the group VPN and that M tunnels connect the second receiving network device to the group VPN. Accordingly, the transmitting network device may duplicate the encrypted probe packet to create N+M encrypted probe packets (e.g., N encrypted probe packets for the first receiving network device and M encrypted probe packets for the second receiving network device).

As shown in FIG. 1D and by reference number 110, the transmitting network device may edit the respective destination addresses of one or more encrypted probe packets of the plurality of encrypted probe packets (e.g., the N+M encrypted probe packets). For example, the transmitting network device may select M encrypted probe packets, of the plurality of encrypted probe packets, and change the respective destination addresses of the outer IP headers of the M encrypted probe packets to identify the virtual tunnel endpoint of the second receiving network device (e.g., 102.0.0.2, as shown in FIG. 1A). Accordingly, the transmitting network device may cause the plurality of encrypted probe packets to include N encrypted probe packets for the first receiving network device (e.g., each with a destination address of 101.0.0.2, as shown in FIGS. 1D) and M encrypted probe packets for the second receiving network device (e.g., each with a destination address of 102.0.0.2, as shown in FIG. 1D).

As shown in FIG. 1E and by reference number 112, the transmitting network device may encapsulate the N encrypted probe packets, of the plurality of encrypted probe packets, for the first receiving network device (e.g., for the N encrypted probe packets to be routed to the first receiving network device via the plurality of tunnels R1-1 through R1-N that connect the first receiving network device to the group VPN). In some implementations, the transmitting network device may encapsulate each encrypted probe packet, of the N encrypted probe packets, using a tunneling protocol (e.g., the GRE tunneling protocol) to create a plurality of encapsulated encrypted packets (e.g., N encapsulated encrypted packets). For example, the transmitting network device may encapsulate an encrypted probe packet with a GRE header to create an encapsulated encrypted probe packet.

Additionally, or alternatively, the transmitting network device may encapsulate an encrypted probe packet, of the N encrypted probe packets, with an outer IP header (e.g., a GRE outer IP header) that includes a source address that identifies a physical tunnel endpoint of the transmitting network device and/or a destination address that identifies a physical tunnel endpoint of the first receiving network device. For example, the transmitting network device may encapsulate a first encrypted probe packet with a GRE outer IP header that includes a source address that identifies a physical tunnel endpoint of tunnel T-1 (e.g., 172.16.0.1) that is associated with the transmitting network device and/or a destination address that identifies a physical tunnel endpoint of tunnel R1-1 (e.g., 172.20.0.1) associated with the first receiving network device; may encapsulate a second encrypted probe packet with a GRE outer IP header that includes a source address that identifies a physical tunnel endpoint of tunnel T-2 (e.g., 172.17.0.1) that is associated with the transmitting network device and/or a destination address that identifies a physical tunnel endpoint of tunnel R1-2 (e.g., 172.21.0.1) associated with the first receiving network device; and/or may encapsulate an $N^{th}$ encrypted probe packet with a GRE outer IP header that includes a source address that identifies a physical tunnel endpoint of tunnel 1-L (e.g., 172.18.0.1) that is associated with the transmitting network device and/or a destination address that identifies a physical tunnel endpoint of tunnel R1-N (e.g., 172.22.0.1) associated with the first receiving network device.

Accordingly, as shown in FIG. 1E, the transmitting network device may create N encapsulated encrypted probe packets (shown as encapsulated encrypted probe packets 1-1 through 1-N), where each encapsulated encrypted probe packet includes an encrypted inner packet (e.g., a probe packet that includes a UDP header and a synthesized data payload), where the encrypted inner packet is encapsulated by an ESP header, the ESP header is encapsulated by an ESP outer IP header, the ESP outer IP header is encapsulated by a GRE header, and the GRE header is encapsulated by a GRE outer IP header. The encapsulations shown in FIG. 1E are provided as examples of encapsulations that can be used. In practice, one or more (or all) of these encapsulations and/or one or more different encapsulations can be used.

As shown in FIG. 1F and by reference number 114, the transmitting network device may encapsulate the M encrypted probe packets, of the plurality of encrypted probe packets, for the second receiving network device (e.g., for the M encrypted probe packets to be routed to the second receiving network device via the plurality of tunnels R2-1 through R2-M that connect the second receiving network device to the group VPN). In some implementations, the transmitting network device may encapsulate each encrypted probe packet, of the M encrypted probe packets, using a tunneling protocol (e.g., the GRE tunneling protocol) to create a plurality of encapsulated encrypted packets (e.g., M encapsulated encrypted packets). For example, the transmitting network device may encapsulate an encrypted probe packet with a GRE header to create an encapsulated encrypted probe packet.

Additionally, or alternatively, the transmitting network device may encapsulate an encrypted probe packet, of the M encrypted probe packets, with an outer IP header (e.g., a GRE outer IP header) that includes a source address that identifies a physical tunnel endpoint of the transmitting network device and/or a destination address that identifies a physical tunnel endpoint of the second receiving network device. For example, the transmitting network device may encapsulate a first encrypted probe packet with a GRE outer IP header that includes a source address that identifies a physical tunnel endpoint of tunnel T-1 (e.g., 172.16.0.1) that is associated with the transmitting network device and/or a destination address that identifies a physical tunnel endpoint of tunnel R2-1 (e.g., 172.25.0.1) associated with the second receiving network device; may encapsulate a second encrypted probe packet with a GRE outer IP header that includes a source address that identifies a physical tunnel endpoint of tunnel T-2 (e.g., 172.17.0.1) that is associated with the transmitting network device and/or a destination address that identifies a physical tunnel endpoint of tunnel R2-2 (e.g., 172.26.0.1) associated with the second receiving network device; and/or may encapsulate an $M^{th}$ encrypted probe packet with a GRE outer IP header that includes a source address that identifies a physical tunnel endpoint of tunnel 1-L (e.g., 172.18.0.1) that is associated with the transmitting network device and/or a destination address that identifies a physical tunnel endpoint of tunnel R2-M (e.g., 172.27.0.1) associated with the second receiving network device.

Accordingly, as shown in FIG. 1F, the transmitting network device may create M encapsulated encrypted probe packets (shown as encapsulated encrypted probe packets 2-1 through 2-M), where each encapsulated encrypted probe packet includes an encrypted inner packet (e.g., a probe packet that includes a UDP header and a synthesized data payload), where the encrypted inner packet is encapsulated by an ESP header, the ESP header is encapsulated by an ESP outer IP header, the ESP outer IP header is encapsulated by a GRE header, and the GRE header is encapsulated by a GRE outer IP header. The encapsulations shown in FIG. 1F are provided as examples of encapsulations that can be used. In practice, one or more (or all) of these encapsulations and/or one or more different encapsulations can be used.

As shown in FIG. 1G and by reference number 116, the transmitting network device may send the plurality of encapsulated encrypted probe packets to the first receiving network device and the second receiving network device (e.g., send the N encapsulated encrypted probe packets to the first receiving network device via the N tunnels that connect the first receiving network device to the group VPN and the M encapsulated encrypted probe packets to the second receiving network device via the M tunnels that connect the second receiving network device to the group VPN). For example, the transmitting network device may transmit, of the N encapsulated encrypted probe packets, a first encapsulated encrypted probe packet to the first receiving network device via tunnel T-1 and tunnel R1-1; a second encapsulated encrypted probe packet to the first receiving network device via tunnel T-2 and tunnel R1-2; and an $N^{th}$ encapsulated encrypted probe packet to the first receiving network device via tunnel T-L and tunnel R1-N. As another example, the transmitting network device may transmit, of the M encapsulated encrypted probe packets, a first encapsulated encrypted probe packet to the second receiving network device via tunnel T-1 and tunnel R2-1; a second encapsulated encrypted probe packet to the second receiving network device via tunnel T-2 and tunnel R2-2; and an $M^{th}$ encapsulated encrypted probe packet to the second receiving network device via tunnel T-L and tunnel R2-M. It is possible for tunnels T-1 through T-L to each carry a single encapsulated encrypted probe packet, multiple encapsulated encrypted probe packets, or a different quantity of encapsulated encrypted probe packets than another one of the tunnels T-1 through T-L (e.g., tunnel T-1 may carry a different quantity of encapsulated encrypted probe packets than tunnel T-2).

As shown in FIG. 1H and by reference number 118, a receiving network device (e.g., either the first receiving network device or the second receiving network device) may receive, via a particular tunnel (shown as a receiving tunnel in FIG. 1H) of the plurality of tunnels that connect the receiving network device to the group VPN, one of the encapsulated encrypted probe packets (hereinafter referred to as "the first-received encapsulated encrypted probe packet") prior to receiving any other encapsulated encrypted probe packet.

As shown by reference number 120, the receiving network device may decapsulate the first-received encapsulated encrypted probe packet. For example, the receiving network device may remove a GRE outer IP header and/or a GRE header from the first-received encapsulated encrypted probe packet. Accordingly, the receiving network device may decapsulate the first-received encapsulated encrypted probe packet to expose and/or identify an encrypted probe packet included in the first-received encapsulated encrypted probe packet. In some implementations, the receiving network device may process (e.g., parse) an ESP header of the encrypted probe packet (e.g., that was exposed after the receiving network device decapsulated the first-received encapsulated encrypted probe packet) to identify a timestamp associated with the ESP header. In some implementations, the receiving network device may process the ESP header of the first-received encapsulated encrypted probe packet to identify the timestamp associated with the ESP header without decapsulating the first-received encapsulated encrypted probe packet.

As shown by reference number 122, the receiving network device may cause the timestamp to be stored in a data structure (e.g., a data structure that is included in the receiving network device and/or accessible to the receiving network device). For example, the receiving network device may send the timestamp to the data structure to cause the data structure to include the timestamp in an entry and to cause the data structure to store the entry in the data structure. The timestamp may be used to determine whether a subsequently received encapsulated encrypted probe packet is a duplicate of the first-received encapsulated encrypted probe packet.

As shown by reference number 124, the receiving network device may decrypt (e.g., using the decryption key included in the VPN key set) the encrypted probe packet. For example, the receiving network device may decrypt the encrypted probe packet using the ESP protocol that was used by the transmitting network device to encrypt the probe packet (e.g., as described herein in relation to FIG. 1B and reference number 106). In some implementations, the receiving network device may process the ESP header of the encrypted probe packet to identify the ESP protocol and may decrypt the encrypted probe packet using the ESP protocol. In some implementations, when decrypting the encrypted probe packet, the receiving network device may remove an ESP outer IP header and/or the ESP header from the encrypted probe packet. Accordingly, the receiving network device may decrypt the encrypted probe packet to expose and/or identify a probe packet (e.g., an inner packet of the encrypted probe packet).

As shown by reference number 126, the receiving network device may copy the probe packet (e.g., that was exposed after the receiving network device decrypted the encrypted probe packet) and may cause the copy of the probe packet to be stored in the data structure. For example, the receiving network device may send the copy of the probe packet to the data structure to cause the data structure to include the copy of the probe packet in the entry that includes the timestamp in the data structure. The data structure may store the entry in the data structure for a period of time (e.g., 100 milliseconds, 1 second, 10 seconds and/or the like) before deleting the entry. Additionally, or alternatively, the data structure may store the entry in the data structure while a difference between a current time and the timestamp satisfies (e.g., is less than) a threshold. Otherwise, the data structure may delete the entry. In this way, the data structure ensures that only current timestamps and current copies of probe packets are stored in the data structure.

As shown by reference number 128, the receiving network device may modify the probe packet. For example, the receiving network device may process the probe packet to identify a synthesized data payload of the probe packet and may update the synthesized data payload of the probe packet. The receiving network device may update the synthesized data payload to include information concerning a time at which the receiving network device received the first-received encapsulated encrypted probe packet (e.g., a receive time, or RX time) and/or information concerning a time at which the receiving network device is to send (e.g., route, transmit, and/or the like) the probe packet (e.g., a transmission time, or TX time) to the transmitting network device.

As shown by reference number 130, the receiving network device may send the probe packet (e.g., after modifying the probe packet) to the transmitting network device. For example, the receiving network device may process the probe packet to identify a UDP header of the probe packet (e.g., that indicates that the receiving network device is to send (e.g., transmit, route, and/or the like) the probe packet to the transmitting network device). The receiving network device may send, based on the UDP header, the probe packet to the transmitting network device via a particular tunnel, of the plurality of tunnels that connect the receiving network device to the group VPN, that transmitted the first-received encapsulated encrypted probe packet from the group VPN to the receiving network device (e.g., the receiving tunnel shown in FIG. 1I). The probe packet may then be transmitted to the transmitting network device via a particular tunnel, of the plurality of tunnels that connect the transmitting network device to the group VPN, that transmitted the first-received encapsulated encrypted probe from the transmitting network device to the group VPN.

Additionally, or alternatively, as shown in FIG. 1I and by reference number 132, the receiving network device may receive, via a different tunnel (shown as additional receiving tunnel in FIG. 1I) of the plurality of tunnels that connect the receiving network device to the group VPN, an additional encapsulated encrypted probe packet, of the plurality of encapsulated encrypted probe packets, after receiving the first-received encapsulated encrypted probe packet. The additional encapsulated encrypted probe packet may have a same or similar structure as the first-received encapsulated encrypted probe packet. For example, the additional encapsulated encrypted probe packet may include an encrypted inner packet (e.g., a probe packet that includes an IP header and a data payload), where the encrypted inner packet is encapsulated by an ESP header, the ESP header is encapsulated by an ESP outer IP header, the ESP outer IP header is encapsulated by a GRE header, and the GRE header is encapsulated by a GRE outer IP header.

As shown by reference number 134, the receiving network device may decapsulate the additional encapsulated encrypted probe packet in a similar manner as described herein in relation to FIG. 1H and reference number 120. For example, the receiving network device may remove the GRE outer IP header and/or the GRE header from the additional encapsulated encrypted probe packet. Accordingly, the receiving network device may decapsulate the additional encapsulated encrypted probe packet to expose and/or identify an encrypted probe packet included in the additional encapsulated encrypted probe packet. The receiving network device may process (e.g., parse) the ESP header of the encrypted probe packet (e.g., that was exposed after the receiving network device decapsulated the additional encapsulated encrypted probe packet) to identify a timestamp associated with the ESP header. In some implementations, the receiving network device may process the ESP header of the additional encapsulated encrypted probe packet to identify the timestamp associated with the ESP header without decapsulating the additional encapsulated encrypted probe packet.

In some implementations, the receiving network device may obtain the timestamp associated with the ESP header of the first-received encapsulated encrypted probe packet from the data structure (e.g., the receiving network device may retrieve the entry that includes the timestamp associated with the ESP header of the first-received encapsulated encrypted probe packet from the data structure). The receiving network device may compare the timestamp associated with the ESP header of the additional encapsulated encrypted probe packet and the timestamp associated with the first-received encapsulated encrypted probe packet. When the timestamps match, the receiving network device may determine that the encrypted probe packet of the additional encapsulated encrypted probe packet matches (e.g., is the same as, is a copy of, is a duplicate of, and/or the like) the encrypted probe packet of the first-received encapsulated encrypted probe packet and/or that the probe packet of the additional encapsulated encrypted probe packet matches (e.g., is the same as, is a copy of, is a duplicate of, and/or the like) the probe packet of the first-received encapsulated encrypted probe packet. Accordingly, as shown by reference number 136, the receiving network device may cause the encrypted probe packet of the additional encapsulated encrypted probe packet to be discarded. Otherwise, the receiving network device may process the encrypted probe packet as described herein in relation to FIG. 1H and reference numbers 122-130.

As shown by reference number 138, after causing the encrypted probe packet of the additional encapsulated encrypted probe packet to be discarded, the receiving network device may generate a new probe packet. In some implementations, the receiving network device may generate the new probe packet based on the copy of the probe packet stored in the data structure. For example, the receiving network device may duplicate the copy of the probe packet stored in the data structure to generate the new probe packet. As another example, the receiving network device may remove the copy of the probe packet from the data structure (e.g., from the entry stored in the data structure that includes the copy of the probe packet) and cause the copy of the probe packet to be the new probe packet. The receiving network device may then cause the entry to be deleted from the data structure.

As shown by reference number 140, the receiving network device may modify the new probe packet. For example, the receiving network device may update a synthesized data payload of the probe packet. The receiving network device may update the synthesized data payload to include information concerning when the receiving network device received the additional encapsulated encrypted probe packet (e.g., a receive time, or RX time) and/or information concerning when the receiving network device is to send (e.g., route, transmit, and/or the like) the new probe packet (e.g., a transmit time, or TX time) to the transmitting network device.

As shown by reference number 142, the receiving network device may send the modified new probe packet (e.g., after modifying the new probe packet) to the transmitting network device. For example, the receiving network device may process the new probe packet to identify a UDP header of the new probe packet (e.g., that indicates that the receiving network device is to send (e.g., transmit, route, and/or the like) the new probe packet to the transmitting network device). The receiving network device may send, based on the UDP header, the new probe packet to the transmitting network device via the different tunnel (shown as additional receiving tunnel in FIG. 1I), of the plurality of tunnels that connect the receiving network device to the group VPN, that transmitted the additional encapsulated encrypted probe packet from the transmitting network device to the receiving network device. The probe packet may then be transmitted to the transmitting network device via a particular tunnel, of the plurality of tunnels that connect the transmitting network device to the group VPN, that transmitted the additional encapsulated encrypted probe from the transmitting network device to the group VPN.

While some example implementations described herein in relation to FIGS. 1A-1N are directed to processing, transmitting, and/or receiving probe packets, contemplated implementations include processing, transmitting, and/or receiving any kind of packet that can be processed, transmitted, and/or received by a network device. For example, some example implementations described herein in relation to FIGS. 1J-1N are directed to processing, transmitting, and/or receiving data packets.

As shown in FIG. 1J, the transmitting network device may be associated with a first local area network (LAN) (shown as LAN 1, 192.168.1.1/24) and the first receiving network device may be associated with a second LAN (shown as LAN 2, 192.168.2.1/24). For example, the transmitting network device may be a gateway to the first LAN that includes a first host (e.g., a first endpoint device that is a source or destination for network traffic) and the first receiving network device may be a gateway to the second LAN that includes a second host (e.g., a second endpoint device that is a source or destination for network traffic).

As shown in FIG. 1J, and by reference number 144, the transmitting network node may receive a data packet. For example, the transmitting network node may receive a data packet sent by the first host associated with the first LAN. As shown in FIG. 1J, the data packet may include an IP header and a data payload. The IP header may include a source address associated with the transmitting network device (e.g., that identifies the first LAN, 192.168.1.1) and a destination address associated with the first receiving network device (e.g., that identifies the second LAN, 192.168.2.1).

As shown by reference number 146, the transmitting network device may encrypt (e.g., using the encryption key from the VPN key set) the data packet to create an encrypted data packet (e.g., for the first receiving network device, as shown in FIG. 1J). For example, the transmitting network device may encrypt the data packet using the ESP protocol, which may cause the data packet to be encapsulated with an ESP header. Additionally, or alternatively, the transmitting network device may encapsulate the encrypted data packet with an outer IP header (e.g., an ESP outer IP header) that includes a source address that identifies the virtual tunnel endpoint of the transmitting network device (e.g., 100.0.0.1, as shown in FIG. 1J) and/or a destination address that identifies the virtual tunnel endpoint of the first receiving network device (e.g., 101.0.0.2, as shown in FIG. 1J). Accordingly, as shown in FIG. 1J, the transmitting network device may create an encrypted data packet that includes an inner packet (e.g., the data packet that includes the IP header and the data payload) that is encapsulated by an ESP header, which is encapsulated by the ESP outer IP header.

As shown in FIG. 1K and by reference number 148, the transmitting network device may duplicate the encrypted data packet to create a plurality of encrypted data packets (shown in FIG. 1K as encrypted data packets 1-1 through 1-N). In some implementations, the transmitting network device may determine the number of tunnels that connect the first receiving network to the group VPN and may duplicate the encrypted data packet to create the same number of the encrypted data packets. For example, the transmitting network device may determine that N tunnels connect the receiving network device to the group VPN and may duplicate the encrypted data packet to create N encrypted data packets.

As shown in FIG. 1L and by reference number 150, the transmitting network device may encapsulate the plurality of encrypted data packets (e.g., for the N encrypted probe packets to be routed to the first receiving network device via the plurality of tunnels R1-1 through R1-N that connect the first receiving network device to the group VPN). In some implementations, the transmitting network device may encapsulate each encrypted data packet using a tunneling protocol (e.g., the GRE tunneling protocol) to create a plurality of encapsulated encrypted data packets (e.g., N encapsulated encrypted data packets). For example, the transmitting network device may encapsulate an encrypted data packet with a GRE header to create an encapsulated encrypted data packet.

Additionally, or alternatively, the transmitting network device may encapsulate an encrypted data packet with an outer IP header (e.g., a GRE outer IP header) that includes a source address that identifies a physical tunnel endpoint of the network device and/or a destination address that identifies a physical tunnel endpoint of the first receiving network device. For example, the transmitting network device may encapsulate a first encrypted data packet with a GRE outer IP header that includes a source address that identifies a physical tunnel endpoint of tunnel T-1 (e.g., 172.16.0.1) that is associated with the transmitting network device and/or a destination address that identifies a physical tunnel endpoint of tunnel R1-1 (e.g., 172.20.0.1) associated with the first receiving network device; may encapsulate a second encrypted data packet with a GRE outer IP header that includes a source address that identifies a physical tunnel endpoint of tunnel T-2 (e.g., 172.17.0.1) that is associated with the transmitting network device and/or a destination address that identifies a physical tunnel endpoint of tunnel R1-2 (e.g., 172.21.0.1) associated with the first receiving network device; and/or may encapsulate an $N^{th}$ encrypted data packet with a GRE outer IP header that includes a source address that identifies a physical tunnel endpoint of tunnel 1-L (e.g., 172.18.0.1) that is associated with the transmitting network device and/or a destination address that identifies a physical tunnel endpoint of tunnel R1-N (e.g., 172.22.0.1) associated with the first receiving network device.

Accordingly, as shown in FIG. 1L, the transmitting network device may create N encapsulated encrypted data packets (shown as encapsulated encrypted data packets 1-1 through 1-N), where each encapsulated encrypted data packet includes an encrypted inner packet (e.g., a data packet that includes an IP header and a data payload), where the encrypted inner packet is encapsulated by an ESP header, the ESP header is encapsulated by an ESP outer IP header, the ESP outer IP header is encapsulated by a GRE header, and the GRE header is encapsulated by a GRE outer IP header. The encapsulations shown in FIG. 1L are provided as examples of encapsulations that can be used. In practice, one or more (or all) of these encapsulations and/or one or more different encapsulations can be used.

As shown in FIG. 1M and by reference number 152, the transmitting network device may send the plurality of encapsulated encrypted data packets to the first receiving network device (e.g., send the N encapsulated encrypted data packets to the first receiving network device via the N tunnels that connect the first receiving network device to the group VPN). For example, the transmitting network device may transmit, of the N encapsulated encrypted data packets, a first encapsulated encrypted data packet to the first receiving network device via tunnel T-1 and tunnel R1-1; a second encapsulated encrypted data packet to the first receiving network device via tunnel T-2 and tunnel R1-2; and an $N^{th}$ encapsulated encrypted data packet to the first receiving network device via tunnel T-L and tunnel R1-N. It is possible for tunnels T-1 through T-L to each carry a single encapsulated encrypted data packet, multiple encapsulated encrypted data packets, or a different quantity of encapsulated encrypted data packets than another one of the tunnels T-1 through T-L (e.g., tunnel T-1 may carry a different quantity of encapsulated encrypted data packets than tunnel T-2).

As shown in FIG. 1N and by reference number 154, the first receiving network device may receive, via a particular tunnel (shown as a receiving tunnel in FIG. 1N) of the plurality of tunnels that connect the first receiving network device to the group VPN, one of the encapsulated encrypted data packets (hereinafter referred to as "the first-received encapsulated encrypted data packet") prior to receiving any other encapsulated encrypted data packet.

As shown by reference number 156, the first receiving network device may decapsulate the first-received encapsulated encrypted data packet. For example, the first receiving network device may remove a GRE outer IP header and/or a GRE header from the first-received encapsulated encrypted data packet. Accordingly, the first receiving network device may decapsulate the first-received encapsulated encrypted data packet to expose and/or identify an encrypted data packet included in the first-received encapsulated encrypted data packet. In some implementations, the first receiving network device may process (e.g., parse) an ESP header of the encrypted data packet (e.g., that was exposed after the first receiving network device decapsulated the first-received encapsulated encrypted data packet) to identify a timestamp associated with the ESP header. In some implementations, the first receiving network device may process the ESP header of the first-received encapsulated encrypted data packet to identify the timestamp associated with the ESP header without decapsulating the first-received encapsulated encrypted data packet.

As shown by reference number 158, the first receiving network device may cause the timestamp to be stored in a data structure (e.g., a data structure that is included in the first receiving network device and/or accessible to the first receiving network device). For example, the first receiving network device may send the timestamp to the data structure to cause the data structure to include the timestamp in an entry and to cause the data structure to store the entry in the data structure. The timestamp may be used to determine whether a subsequently received encapsulated encrypted data packet is a duplicate of the first-received encapsulated encrypted data packet.

As shown by reference number 160, the first receiving network device may decrypt (e.g., using the decryption key included in the VPN key set) the encrypted data packet. For example, the first receiving network device may decrypt the encrypted data packet using the ESP protocol that was used by the transmitting network device to encrypt the data packet (e.g., as described herein in relation to FIG. 1J and reference number 146). In some implementations, the first receiving network device may process the ESP header of the encrypted data packet to identify the ESP protocol and may decrypt the encrypted data packet using the ESP protocol. In some implementations, when decrypting the encrypted data packet, the first receiving network device may remove an ESP outer IP header and/or the ESP header from the encrypted data packet. Accordingly, the first receiving network device may decrypt the encrypted data packet to expose and/or identify a data packet (e.g., an inner packet of the encrypted data packet).

In some implementations, the first receiving network device may process the data packet (e.g., that was exposed after the receiving network device decrypted the encrypted data packet) to identify an IP header of the data packet and/or a data payload of the data packet. The first receiving network device may parse the IP header to identify and/or determine a destination address of the IP header (e.g., that identifies the second LAN, 192.168.2.1). As shown by reference number 162, the first receiving network device may send (e.g. route, transmit, and/or the like) the data packet to the destination address of the IP header (e.g., to the second host associated with the second LAN).

Additionally, or alternatively, the first receiving network device may receive, via a different tunnel of the plurality of tunnels, an additional encapsulated encrypted data packet, of the plurality of encapsulated encrypted data packets, after receiving the first-received encapsulated encrypted data packet. The additional encapsulated encrypted data packet may have a same or similar structure as the first-received encapsulated encrypted data packet. For example, the additional encapsulated encrypted data packet may include an inner packet (e.g., a data packet that includes an IP header and a data payload), where the inner packet is encapsulated by an ESP header, the ESP header is encapsulated by an ESP outer IP header, the ESP outer IP header is encapsulated by a GRE header, and the GRE header is encapsulated by a GRE outer IP header.

In some implementations, the first receiving network device may decapsulate the additional encapsulated encrypted data packet in a similar manner as described herein in relation to reference number 156. For example, the first receiving network device may remove the GRE outer IP header and/or the GRE header from the additional encapsulated encrypted data packet. Accordingly, the first receiving network device may decapsulate the additional encapsulated encrypted data packet to expose and/or identify an encrypted data packet included in the additional encapsulated encrypted data packet. The first receiving network device may process (e.g., parse) the ESP header of the encrypted data packet (e.g., that was exposed after the receiving network device decapsulated the additional encapsulated encrypted data packet) to identify a timestamp associated with the ESP header. In some implementations, the first receiving network device may process the ESP header of the additional encapsulated encrypted data packet to identify the timestamp associated with the ESP header without decapsulating the additional encapsulated encrypted data packet.

In some implementations, the first receiving network device may obtain the timestamp associated with the ESP header of the first-received encapsulated encrypted data packet from the data structure (e.g., the receiving network device may retrieve the entry that includes the timestamp associated with the ESP header of the first-received encapsulated encrypted data packet from the data structure). The receiving network device may compare the timestamp associated with the ESP header of the additional encapsulated encrypted data packet and the timestamp associated with the first-received encapsulated encrypted data packet. When the timestamps match, the receiving network device may determine that the encrypted data packet of the additional encapsulated encrypted data packet matches (e.g., is the same as, is a copy of, is a duplicate of, and/or the like) the encrypted data packet of the first-received encapsulated encrypted data packet and/or that the data packet of the additional encapsulated encrypted data packet matches (e.g., is the same as, is a copy of, is a duplicate of, and/or the like) the data packet of the first-received encapsulated encrypted data packet. Accordingly, as shown by reference number 164, the receiving network device may cause the encrypted data packet of the additional encapsulated encrypted data packet to be discarded.

As indicated above, FIGS. 1A-1N are provided as an example. Other examples may differ from what is described with regard to FIGS. 1A-1N. The number and arrangement of devices shown in FIGS. 1A-1N are provided as an example. In practice, there may be additional devices, fewer devices, different devices, or differently arranged than those shown in FIGS. 1A-1N. Furthermore, two or more devices shown in FIGS. 1A-1N may be implemented within a single device, or a single device shown in FIGS. 1A-1N may be implemented as multiple, distributed devices. Additionally, or alternatively, a set of devices (e.g., one or more devices) shown in FIGS. 1A-1N may perform one or more functions described as being performed by another set of devices shown in FIGS. 1A-1N.

Figure 2:
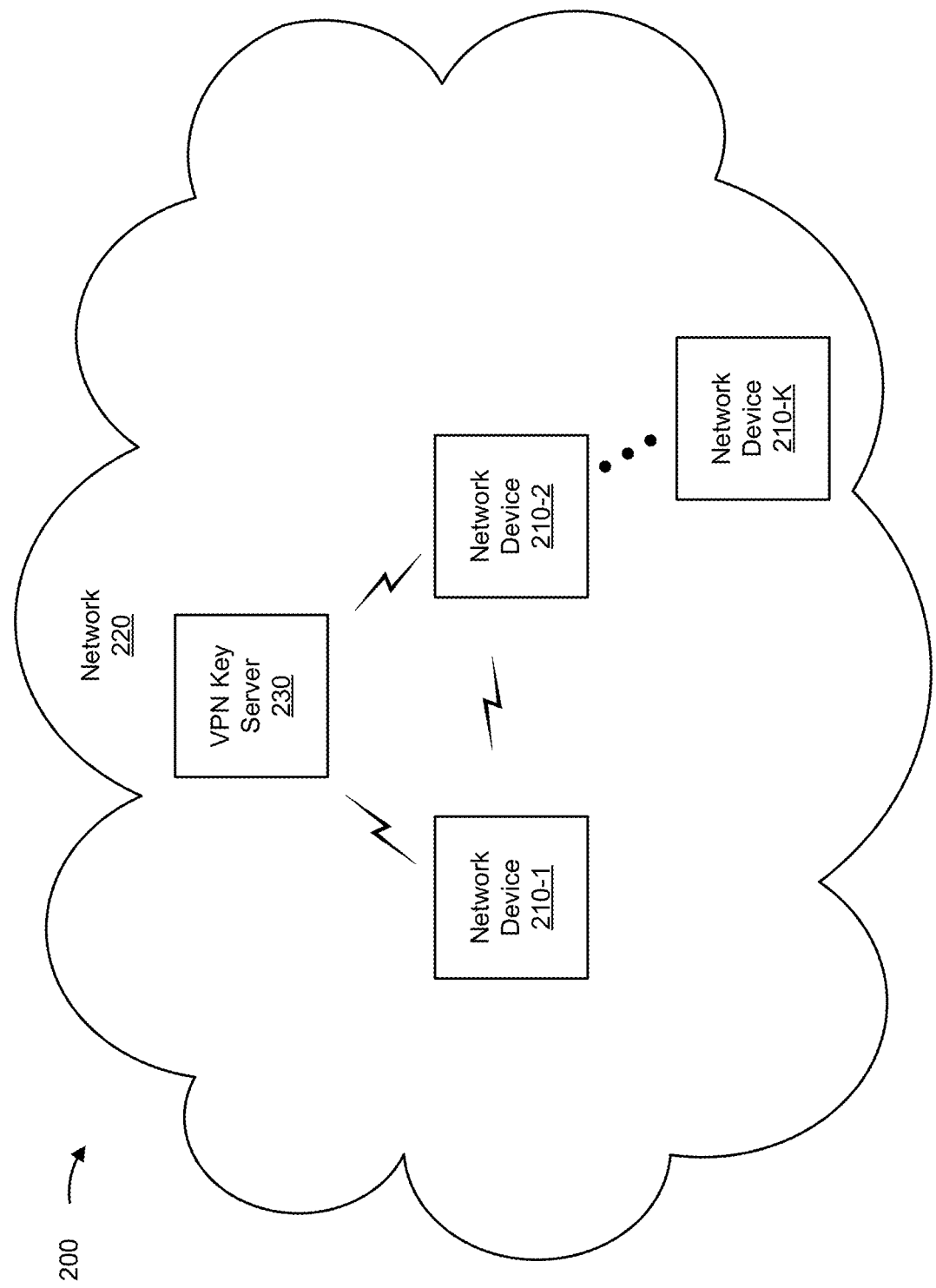
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include network device 210-1 through network device 210-K (K≥2) (hereinafter referred to collectively as "network devices 210," and individually as "network device 210"), a network 220, and a VPN key server 230. Devices of environment 200 may interconnect via wired connections, wireless connections, or a combination of wired and wireless connections.

Network device 210 includes one or more devices capable of receiving, transmitting, storing, generating, and/or processing information, as described herein. In some implementations, network device 210 may include a router, a switch, a gateway, a firewall device, a modem, a hub, a bridge, a policer, a network interface controller (NIC), a reverse proxy, a server (e.g., a proxy server), a multiplexer, a security device, an intrusion detection device, a load balancer, or a similar device. In some implementations, network device 210 may be implemented as a physical device implemented within a housing, such as a chassis. In some implementations, network device 210 may be implemented as a virtual device implemented by one or more computer devices of a cloud computing environment or a data center. In some implementations, network device 210 may correspond to a transmitting network device and/or a receiving network device. In some implementations, network device 210 may process, transmit, and/or receive a packet (e.g., a data packet, a probe packet, and/or the like). In some implementations, network devices 210 may form a VPN, such as a group VPN.

Network 220 includes one or more wired and/or wireless networks. For example, network may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

VPN key server 230 includes one or more devices capable of receiving, generating, storing, processing, providing, and/or routing information associated with distributing a VPN key set to the network devices 210. VPN key server 230 may include a communication device and/or a computing device. For example, VPN key server 230 may include a server, an application server, a client server, a web server, a database server, a host server, a proxy server, a virtual server (e.g., executing on computing hardware), a server in a cloud computing system, a device that includes computing hardware used in a cloud computing environment, or a similar type of device. VPN key server 230 may communicate with one or more other devices of environment 200, as described elsewhere herein.

The number and arrangement of devices and networks shown in FIG. 2 are provided as one or more examples. In practice, there may be additional devices, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3B:
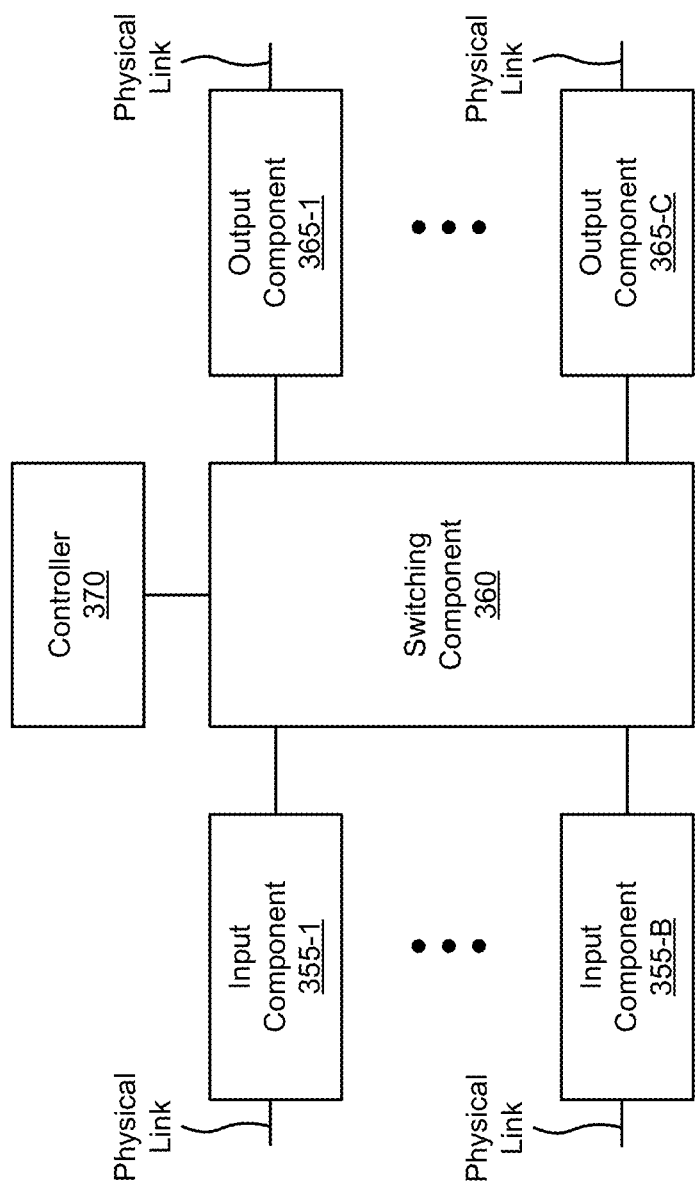

FIGS. 3A-3B are diagrams of example components of one or more devices of FIG. 2. FIG. 3A is a diagram of example components of a device 300. Device 300 may correspond to one or more of network devices 210, VPN key server 230, and/or the like. In some implementations, one or more network devices 210, VPN key server 230, and/or the like may include one or more devices 300 and/or one or more components of device 300. As shown in FIG. 3A, device 300 may include a bus 305, a processor 310, a memory 315, a storage component 320, an input component 325, an output component 330, and a communication interface 335.

Bus 305 includes a component that permits communication among the components of device 300. Processor 310 is implemented in hardware, firmware, or a combination of hardware and software. Processor 310 takes the form of a central processing unit (CPU), a graphics processing unit (GPU), an accelerated processing unit (APU), a microprocessor, a microcontroller, a digital signal processor (DSP), a field-programmable gate array (FPGA), an ASIC, or another type of processing component. In some implementations, processor 310 includes one or more processors capable of being programmed to perform a function. Memory 315 includes a random access memory (RAM), a read only memory (ROM), and/or another type of dynamic or static storage device (e.g., a flash memory, a magnetic memory, and/or an optical memory) that stores information and/or instructions for use by processor 310.

Storage component 320 stores information and/or software related to the operation and use of device 300. For example, storage component 320 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 325 includes a component that permits device 300 to receive information, such as via user input (e.g., a touch screen display, a keyboard, a keypad, a mouse, a button, a switch, and/or a microphone). Additionally, or alternatively, input component 325 may include a sensor for sensing information (e.g., a global positioning system (GPS) component, an accelerometer, a gyroscope, and/or an actuator). Output component 330 includes a component that provides output information from device 300 (e.g., a display, a speaker, and/or one or more light-emitting diodes (LEDs)).

Communication interface 335 includes a transceiver-like component (e.g., a transceiver and/or a separate receiver and transmitter) that enables device 300 to communicate with other devices, such as via a wired connection, a wireless connection, or a combination of wired and wireless connections. Communication interface 335 may permit device 300 to receive information from another device and/or provide information to another device. For example, communication interface 335 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 310 executing software instructions stored by a non-transitory computer-readable medium, such as memory 315 and/or storage component 320. A computer-readable medium is defined herein as a non-transitory memory device. A memory device includes memory space within a single physical storage device or memory space spread across multiple physical storage devices.

Software instructions may be read into memory 315 and/or storage component 320 from another computer-readable medium or from another device via communication interface 335. When executed, software instructions stored in memory 315 and/or storage component 320 may cause processor 310 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

FIG. 3B is a diagram of example components of a device 350. Device 350 may correspond to one or more of network devices 210, VPN key server 230, and/or the like. In some implementations, one or more network devices 210, VPN key server 230, and/or the like may include one or more devices 350 and/or one or more components of device 350. As shown in FIG. 3B, device 350 may include one or more input components 355-1 through 355-B (B≥1) (hereinafter referred to collectively as input components 355, and individually as input component 355), a switching component 360, one or more output components 365-1 through 365-C (C≥1) (hereinafter referred to collectively as output components 365, and individually as output component 365), and a controller 370.

Input components 355 may be points of attachment for physical tunnels and may be points of entry for incoming traffic, such as packets. Input component 355 may process incoming traffic, such as by performing data tunnel layer encapsulation or decapsulation. In some implementations, input component 355 may send and/or receive packets. In some implementations, input component 355 may include an input line card that includes one or more packet processing components (e.g., in the form of integrated circuits), such as one or more interface cards (IFCs), packet forwarding components, line card controller components, input ports, processors, memories, and/or input queues. In some implementations, device 350 may include one or more input components 355.

Switching component 360 may interconnect input components 355 with output components 365. In some implementations, switching component 360 may be implemented via one or more crossbars, via busses, and/or with shared memories. The shared memories may act as temporary buffers to store packets from input components 355 before the packets are eventually scheduled for delivery to output components 365. In some implementations, switching component 360 may enable input components 355, output components 365, and/or controller 370 to communicate.

Output component 365 may store packets and may schedule packets for transmission on output physical tunnels. Output component 365 may support data tunnel layer encapsulation or decapsulation, and/or a variety of higher-level protocols. In some implementations, output component 365 may send packets and/or receive packets. In some implementations, output component 365 may include an output line card that includes one or more packet processing components (e.g., in the form of integrated circuits), such as one or more IFCs, packet forwarding components, line card controller components, output ports, processors, memories, and/or output queues. In some implementations, device 350 may include one or more output components 365. In some implementations, input component 355 and output component 365 may be implemented by the same set of components (e.g., and input/output component may be a combination of input component 355 and output component 365).

Controller 370 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 370 may include one or more processors that can be programmed to perform a function.

In some implementations, controller 370 may include a RAM, a ROM, and/or another type of dynamic or static storage device (e.g., a flash memory, a magnetic memory, an optical memory, etc.) that stores information and/or instructions for use by controller 370.

In some implementations, controller 370 may communicate with other devices, networks, and/or systems connected to device 300 to exchange information regarding network topology. Controller 370 may create routing tables based on the network topology information, create forwarding tables based on the routing tables, and forward the forwarding tables to input components 355 and/or output components 365. Input components 355 and/or output components 365 may use the forwarding tables to perform route lookups for incoming and/or outgoing packets.

Controller 370 may perform one or more processes described herein. Controller 370 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 370 from another computer-readable medium or from another device via a communication interface. When executed, software instructions stored in a memory and/or storage component associated with controller 370 may cause controller 370 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as an example. In practice, device 350 may include additional components, fewer components, different components, or differently arranged components than those shown in FIG. 3B. Additionally, or alternatively, a set of components (e.g., one or more components) of device 350 may perform one or more functions described as being performed by another set of components of device 350.

Figure 4A:
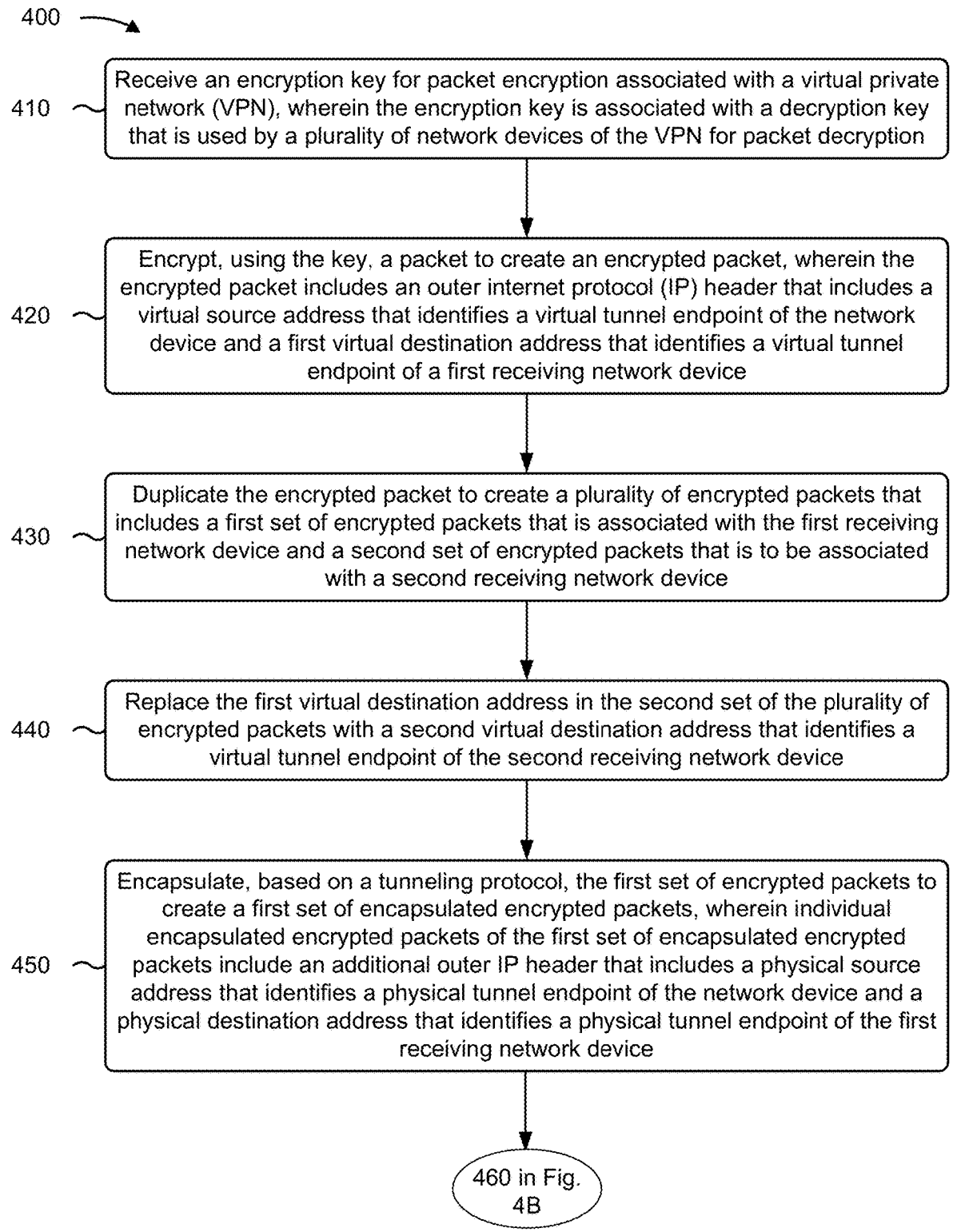
FIGS. 4A and 4B is a flowchart of an example process relating to efficient encryption and decryption of duplicate packets communicated via a virtual private network.
Figure 4B:
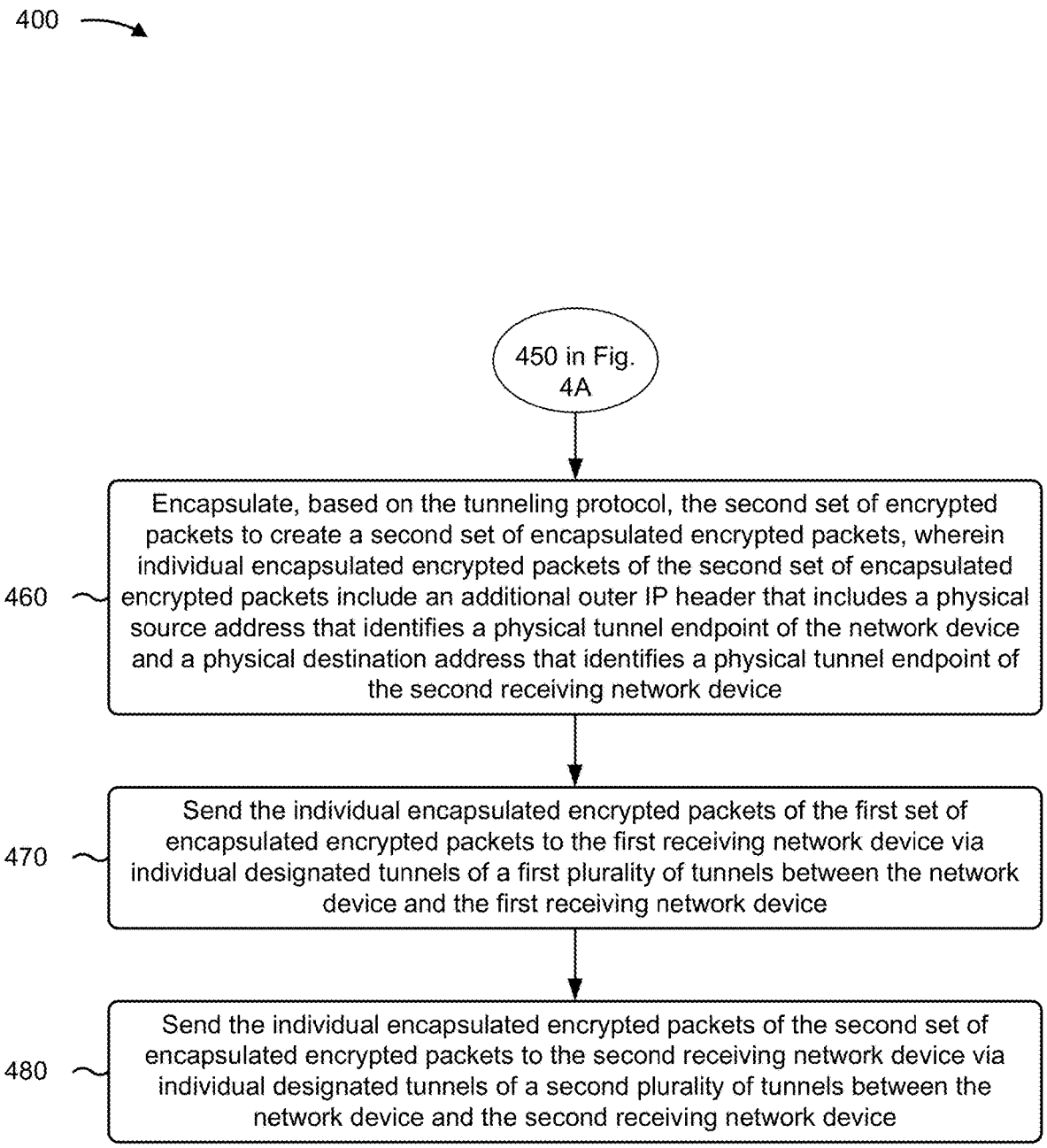

FIGS. 4A-4B depict a flowchart of an example process 400 associated with efficient encryption and decryption of duplicate packets communicated via a virtual private network. In some implementations, one or more process blocks of FIGS. 4A-4B may be performed by a network device (e.g., network device 210). In some implementations, one or more process blocks of FIGS. 4A-4B may be performed by another device or a group of devices separate from or including the network device, such as another network device, and/or the like.

As shown in FIG. 4A, process 400 may include receiving an encryption key for packet encryption associated with a VPN, wherein the encryption key is associated with a decryption key that is used by a plurality of network devices of the VPN for packet decryption (block 410). For example, the network device (e.g., using processor 310, memory 315, storage component 320, input component 325, output component 330, communication interface 335, input component 355, switching component 360, output component 365, controller 370, and/or the like) may receive an encryption key for packet encryption associated with a VPN, as described above. In some implementations, the encryption key is associated with a decryption key that is used by a plurality of network devices of the VPN for packet decryption.

As further shown in FIG. 4A, process 400 may include encrypting, using the key, a packet to create an encrypted packet, wherein the encrypted packet includes an outer IP header that includes a virtual source address that identifies a virtual tunnel endpoint of the network device and a first virtual destination address that identifies a virtual tunnel endpoint of a first receiving network device (block 420). For example, the network device (e.g., using processor 310, memory 315, storage component 320, input component 325, output component 330, communication interface 335, input component 355, switching component 360, output component 365, controller 370, and/or the like) may encrypt, using the key, a packet to create an encrypted packet, as described above. In some implementations, the encrypted packet includes an outer IP header that includes a virtual source address that identifies a virtual tunnel endpoint of the network device and a first virtual destination address that identifies a virtual tunnel endpoint of a first receiving network device.

As further shown in FIG. 4A, process 400 may include duplicating the encrypted packet to create a plurality of encrypted packets that includes a first set of encrypted packets that is associated with the first receiving network device and a second set of encrypted packets that is to be associated with a second receiving network device (block 430). For example, the network device (e.g., using processor 310, memory 315, storage component 320, input component 325, output component 330, communication interface 335, input component 355, switching component 360, output component 365, controller 370, and/or the like) may duplicate the encrypted packet to create a plurality of encrypted packets that includes a first set of encrypted packets that is associated with the first receiving network device and a second set of encrypted packets that is to be associated with a second receiving network device, as described above.

As further shown in FIG. 4A, process 400 may include replacing the first virtual destination address in the second set of the plurality of encrypted packets with a second virtual destination address that identifies a virtual tunnel endpoint of the second receiving network device (block 440). For example, the network device (e.g., using processor 310, memory 315, storage component 320, input component 325, output component 330, communication interface 335, input component 355, switching component 360, output component 365, controller 370, and/or the like) may replace the first virtual destination address in the second set of the plurality of encrypted packets with a second virtual destination address that identifies a virtual tunnel endpoint of the second receiving network device, as described above.

As further shown in FIG. 4A, process 400 may include encapsulating, based on a tunneling protocol, the first set of encrypted packets to create a first set of encapsulated encrypted packets, wherein individual encapsulated encrypted packets of the first set of encapsulated encrypted packets include an additional outer IP header that includes a physical source address that identifies a physical tunnel endpoint of the network device and a physical destination address that identifies a physical tunnel endpoint of the first receiving network device (block 450). For example, the network device (e.g., using processor 310, memory 315, storage component 320, input component 325, output component 330, communication interface 335, input component 355, switching component 360, output component 365, controller 370, and/or the like) may encapsulate, based on a tunneling protocol, the first set of encrypted packets to create a first set of encapsulated encrypted packets, as described above. In some implementations, individual encapsulated encrypted packets of the first set of encapsulated encrypted packets include an additional outer IP header that includes a physical source address that identifies a physical tunnel endpoint of the network device and a physical destination address that identifies a physical tunnel endpoint of the first receiving network device.

As shown in FIG. 4B, process 400 may include encapsulating, based on the tunneling protocol, the second set of encrypted packets to create a second set of encapsulated encrypted packets, wherein individual encapsulated encrypted packets of the second set of encapsulated encrypted packets include an additional outer IP header that includes a physical source address that identifies a physical tunnel endpoint of the network device and a physical destination address that identifies a physical tunnel endpoint of the second receiving network device (block 460). For example, the network device (e.g., using processor 310, memory 315, storage component 320, input component 325, output component 330, communication interface 335, input component 355, switching component 360, output component 365, controller 370, and/or the like) may encapsulate, based on the tunneling protocol, the second set of encrypted packets to create a second set of encapsulated encrypted packets, as described above. In some implementations, individual encapsulated encrypted packets of the second set of encapsulated encrypted packets include an additional outer IP header that includes a physical source address that identifies a physical tunnel endpoint of the network device and a physical destination address that identifies a physical tunnel endpoint of the second receiving network device.

As further shown in FIG. 4B, process 400 may include sending the individual encapsulated encrypted packets of the first set of encapsulated encrypted packets to the first receiving network device via individual designated tunnels of a first plurality of tunnels between the network device and the first receiving network device (block 470). For example, the network device (e.g., using processor 310, memory 315, storage component 320, input component 325, output component 330, communication interface 335, input component 355, switching component 360, output component 365, controller 370, and/or the like) may send the individual encapsulated encrypted packets of the first set of encapsulated encrypted packets to the first receiving network device via individual designated tunnels of a first plurality of tunnels between the network device and the first receiving network device, as described above.

As further shown in FIG. 4B, process 400 may include sending the individual encapsulated encrypted packets of the second set of encapsulated encrypted packets to the second receiving network device via individual designated tunnels of a second plurality of tunnels between the network device and the second receiving network device (block 480). For example, the network device (e.g., using processor 310, memory 315, storage component 320, input component 325, output component 330, communication interface 335, input component 355, switching component 360, output component 365, controller 370, and/or the like) may send the individual encapsulated encrypted packets of the second set of encapsulated encrypted packets to the second receiving network device via individual designated tunnels of a second plurality of tunnels between the network device and the second receiving network device, as described above.

Process 400 may include additional implementations, such as any single implementation or any combination of implementations described below and/or in connection with one or more other processes described elsewhere herein.

In a first implementation, process 400 includes receiving, from the first receiving network device, a modified version of the packet via a tunnel of the first plurality of tunnels and receiving, from the second receiving network device, a modified version of the packet via a tunnel of the second plurality of tunnels.

In a second implementation, alone or in combination with the first implementation, encrypting the packet to create the encrypted packet comprises: encrypting, using an ESP protocol, the packet to create the encrypted packet, the encrypted packet includes the outer IP header and an ESP header.

In a third implementation, alone or in combination with one or more of the first and second implementations, the first set of encapsulated encrypted packets and the second set of encapsulated encrypted packets are encapsulated according to a GRE tunneling protocol and the additional outer IP header comprises a GRE header.

In a fourth implementation, alone or in combination with one or more of the first through third implementations, prior to duplicating the encrypted packet to create the plurality of encrypted packets, process 400 includes determining a first quantity of tunnels in the first plurality of tunnels, and determining a second quantity of tunnels in the second plurality of tunnels, wherein the quantity of the plurality of encrypted packets is based on the first quantity of the first plurality of tunnels and the second quantity of the second plurality of tunnels.

In a fifth implementation, alone or in combination with one or more of the first through fourth implementations, a quantity of the first set of encapsulated encrypted packets corresponds to a quantity of the first plurality of tunnels, and a quantity of the second set of encapsulated encrypted packets corresponds to a quantity of the second plurality of tunnels.

In a sixth implementation, alone or in combination with one or more of the first through fifth implementations, the packet is a probe packet that includes a UDP header and a synthesized data payload.

Although FIGS. 4A-4B show example blocks of process 400, in some implementations, process 400 may include additional blocks, fewer blocks, different blocks, or differently arranged blocks than those depicted in FIGS. 4A-4B. Additionally, or alternatively, two or more of the blocks of process 400 may be performed in parallel.

Figure 5:
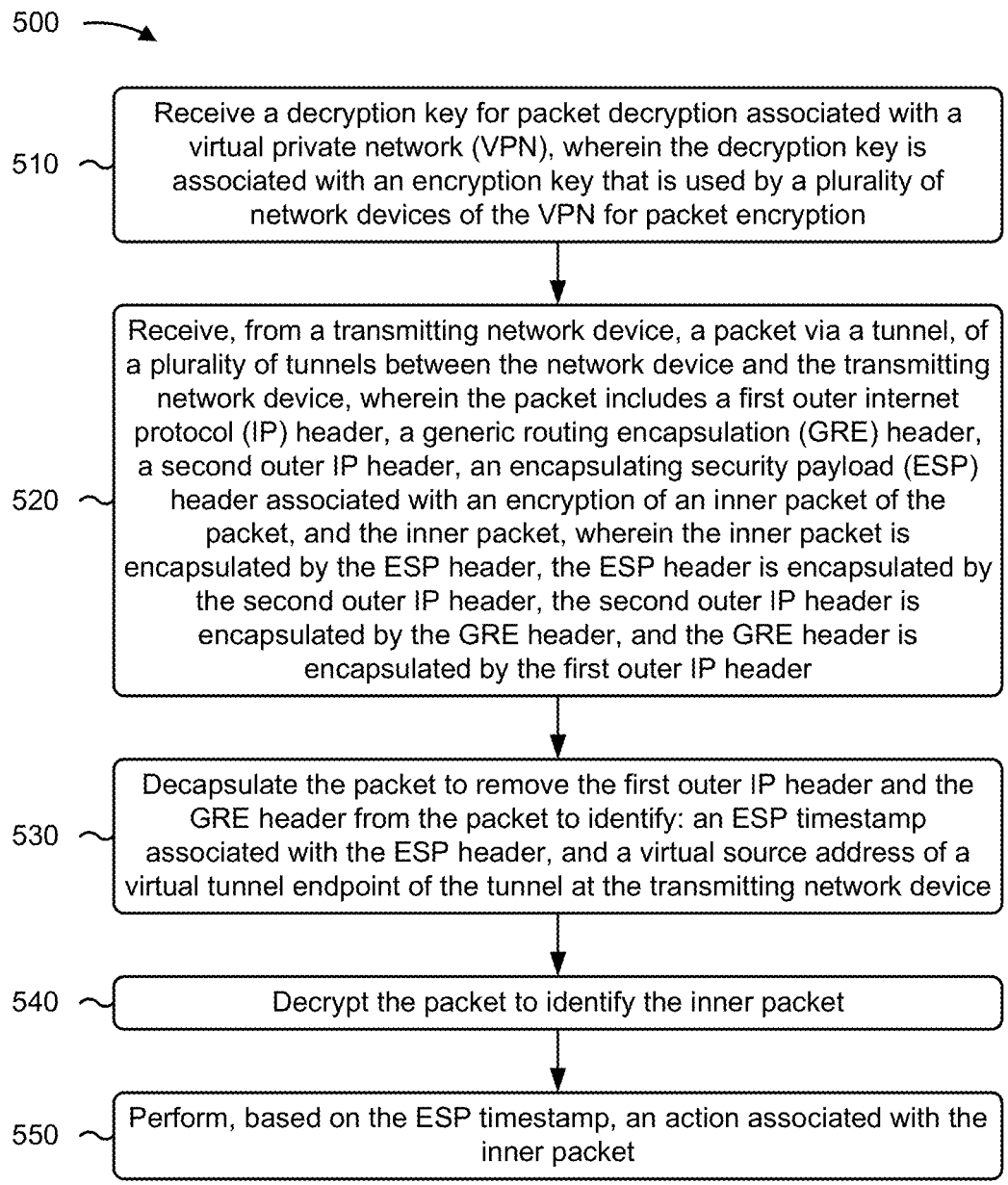
FIGS. 5-6 are flowcharts of example processes relating to efficient encryption and decryption of duplicate packets communicated via a virtual private network.

FIG. 5 is a flowchart of an example process 500 associated with efficient encryption and decryption of duplicate packets communicated via a virtual private network. In some implementations, one or more process blocks of FIG. 5 may be performed by a network device (e.g., network device 210). In some implementations, one or more process blocks of FIG. 5 may be performed by another device or a group of devices separate from or including the network device, such as another network device, and/or the like.

As shown in FIG. 5, process 500 may include receiving a decryption key for packet decryption associated with a virtual private network (VPN), wherein the decryption key is associated with an encryption key that is used by a plurality of network devices of the VPN for packet encryption (block 510). For example, the network device (e.g., using processor 310, memory 315, storage component 320, input component 325, output component 330, communication interface 335, input component 355, switching component 360, output component 365, controller 370, and/or the like) may receive a decryption key for packet decryption associated with a virtual private network (VPN), as described above. In some implementations, the decryption key is associated with an encryption key that is used by a plurality of network devices of the VPN for packet encryption.

As further shown in FIG. 5, process 500 may include receiving, from a transmitting network device, a packet via a tunnel, of a plurality of tunnels between the network device and the transmitting network device, wherein the packet includes a first outer internet protocol (IP) header, a Generic Routing Encapsulation (GRE) header, a second outer IP header, an Encapsulating Security Payload (ESP) header associated with an encryption of an inner packet of the packet, and the inner packet, wherein the inner packet is encapsulated by the ESP header, the ESP header is encapsulated by the second outer IP header, the second outer IP header is encapsulated by the GRE header, and the GRE header is encapsulated by the first outer IP header (block 520). For example, the network device (e.g., using processor 310, memory 315, storage component 320, input component 325, output component 330, communication interface 335, input component 355, switching component 360, output component 365, controller 370, and/or the like) may receive, from a transmitting network device, a packet via a tunnel, of a plurality of tunnels between the network device and the transmitting network device, as described above. In some implementations, the packet includes a first outer internet protocol (IP) header, a Generic Routing Encapsulation (GRE) header, a second outer IP header, an Encapsulating Security Payload (ESP) header associated with an encryption of an inner packet of the packet, and the inner packet. In some implementations, the inner packet is encapsulated by the ESP header, the ESP header is encapsulated by the second outer IP header, the second outer IP header is encapsulated by the GRE header, and the GRE header is encapsulated by the first outer IP header.

As further shown in FIG. 5, process 500 may include decapsulating the packet to remove the first outer IP header and the GRE header from the packet to identify: an ESP timestamp associated with the ESP header, and a virtual source address of a virtual tunnel endpoint of the tunnel at the transmitting network device (block 530). For example, the network device (e.g., using processor 310, memory 315, storage component 320, input component 325, output component 330, communication interface 335, input component 355, switching component 360, output component 365, controller 370, and/or the like) may decapsulate the packet to remove the first outer IP header and the GRE header from the packet to identify, as described above.

As further shown in FIG. 5, process 500 may include decrypt the packet to identify the inner packet (block 540). For example, the network device (e.g., using processor 310, memory 315, storage component 320, input component 325, output component 330, communication interface 335, input component 355, switching component 360, output component 365, controller 370, and/or the like) may decrypt the packet to identify the inner packet, as described above.

As further shown in FIG. 5, process 500 may include performing, based on the ESP timestamp, an action associated with the inner packet (block 550). For example, the network device (e.g., using processor 310, memory 315, storage component 320, input component 325, output component 330, communication interface 335, input component 355, switching component 360, output component 365, controller 370, and/or the like) may perform, based on the ESP timestamp, an action associated with the inner packet, as described above.

Process 500 may include additional implementations, such as any single implementation or any combination of implementations described below and/or in connection with one or more other processes described elsewhere herein.

In a first implementation, performing the action includes updating a payload of the inner packet to create a response packet that includes probe information that identifies a receive time associated with receiving the packet and a transmit time associated with transmitting the packet to the transmitting network device and sending, via the tunnel, the response packet to the transmitting network device.

In second implementation, alone or in combination with the first implementation, performing the action includes generating a response payload that is based on the inner packet and storing the response payload in association with the ESP timestamp and the virtual source address in a data structure to permit the network device to provide the response payload to a subsequently received packet, from the transmitting network device, that includes the inner packet.

In a third implementation, alone or in combination with one or more of the first through second implementations, performing the action includes storing the ESP timestamp in association with the virtual source address in a data structure to permit the network device to determine that a subsequently received packet is associated with the transmitting network device.

In a fourth implementation, alone or in combination with one or more of the first through third implementations, process 500 includes receiving, via a different tunnel, of the plurality of tunnels between the network device and the transmitting network device, an additional packet, wherein the additional packet includes an additional first outer IP header, an additional GRE header, an additional second outer IP header, an additional ESP header, and an additional inner packet, wherein the additional inner packet is encapsulated by the additional ESP header, the additional ESP header is encapsulated by the additional second outer IP header, the additional second outer IP header is encapsulated by the additional GRE header, and the additional GRE header is encapsulated by the additional first outer IP header; decapsulating the additional packet to remove the additional first outer IP header and the additional GRE header from the additional packet; identifying, after decapsulating the additional packet, an ESP timestamp associated with the additional ESP header; obtaining, from a data structure, the ESP timestamp associated with the ESP header; determining, based on the ESP timestamp associated with the additional ESP header and the ESP timestamp associated with the ESP header, that the additional inner packet is a copy of the inner packet; and causing, based on determining that the additional inner packet is a copy of the inner packet, the additional packet to be discarded; and performing an action associated with responding to the transmitting network device via the different tunnel.

In a fifth implementation, alone or in combination with one or more of the first through fourth implementations, process performing the action associated with responding to the transmitting network device via the different tunnel includes obtaining a response payload that is stored in the data structure in association with the ESP timestamp associated with the ESP header, wherein the response payload is being stored in association with receiving the packet; and generating a response packet that includes the response payload and probe information that includes: a receive time associated with receiving the additional packet, and a transmit time associated with responding to the transmitting network device via the different tunnel; and sending, via the different tunnel, the response packet to the transmitting network device.

In a sixth implementation, alone or in combination with one or more of the first through fifth implementations, the packet is a data packet.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
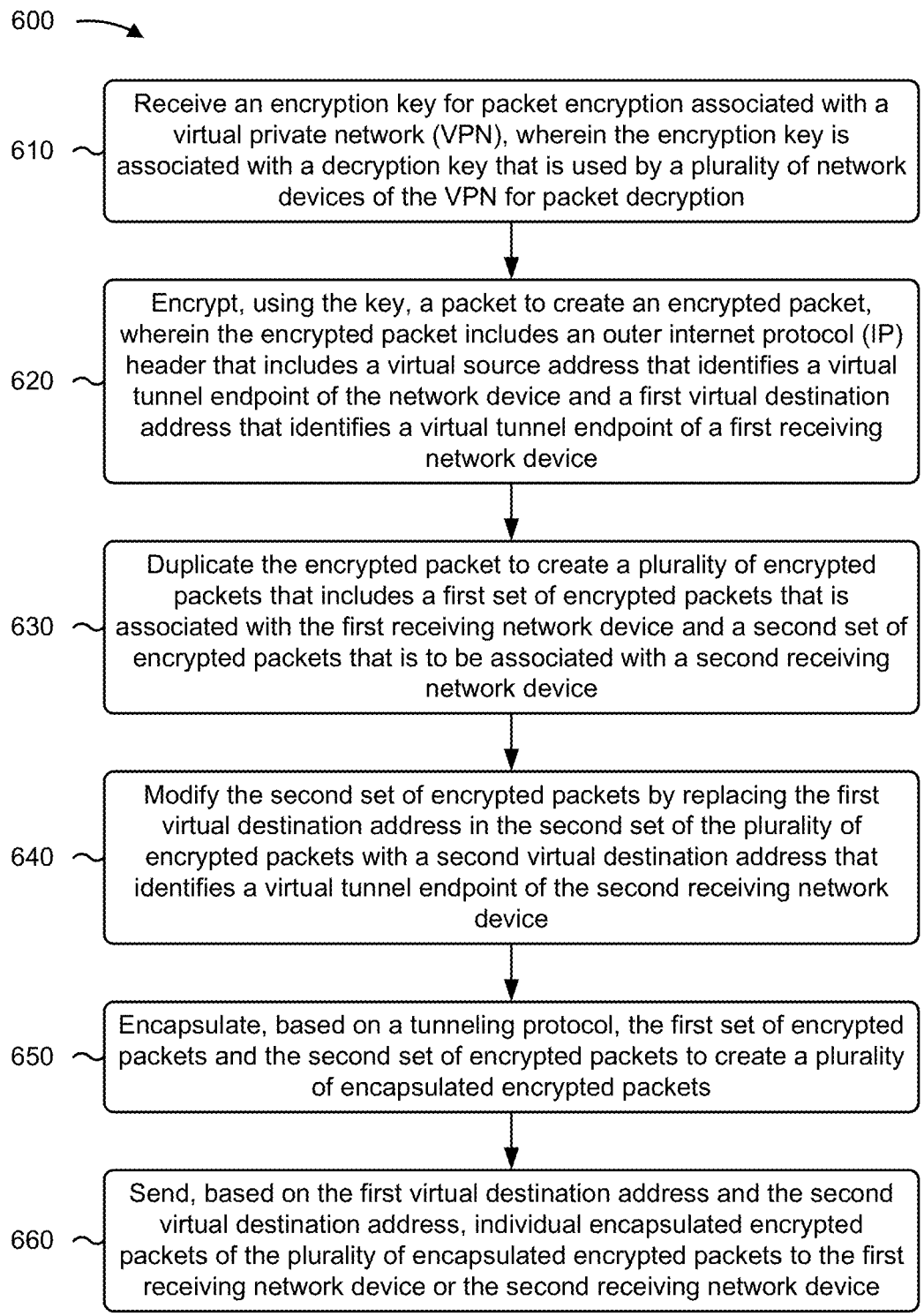

FIG. 6 is a flowchart of an example process 600 associated with efficient encryption and decryption of duplicate packets communicated via a virtual private network. In some implementations, one or more process blocks of FIG. 6 may be performed by a network device (e.g., network device 210). In some implementations, one or more process blocks of FIG. 6 may be performed by another device or a group of devices separate from or including the network device, such as another network device, and/or the like.

As shown in FIG. 6, process 600 may include receiving an encryption key for packet encryption associated with a virtual private network (VPN), wherein the encryption key is associated with a decryption key that is used by a plurality of network devices of the VPN for packet decryption (block 610). For example, the network device (e.g., using processor 310, memory 315, storage component 320, input component 325, output component 330, communication interface 335, input component 355, switching component 360, output component 365, controller 370, and/or the like) may receive an encryption key for packet encryption associated with a virtual private network (VPN), as described above. In some implementations, the encryption key is associated with a decryption key that is used by a plurality of network devices of the VPN for packet decryption.

As further shown in FIG. 6, process 600 may include encrypt, using the key, a packet to create an encrypted packet, wherein the encrypted packet includes an outer internet protocol (IP) header that includes a virtual source address that identifies a virtual tunnel endpoint of the network device and a first virtual destination address that identifies a virtual tunnel endpoint of a first receiving network device (block 620). For example, the network device (e.g., using processor 310, memory 315, storage component 320, input component 325, output component 330, communication interface 335, input component 355, switching component 360, output component 365, controller 370, and/or the like) may encrypt, using the key, a packet to create an encrypted packet, as described above. In some implementations, the encrypted packet includes an outer internet protocol (IP) header that includes a virtual source address that identifies a virtual tunnel endpoint of the network device and a first virtual destination address that identifies a virtual tunnel endpoint of a first receiving network device.

As further shown in FIG. 6, process 600 may include duplicating the encrypted packet to create a plurality of encrypted packets that includes a first set of encrypted packets that is associated with the first receiving network device and a second set of encrypted packets that is to be associated with a second receiving network device (block 630). For example, the network device (e.g., using processor 310, memory 315, storage component 320, input component 325, output component 330, communication interface 335, input component 355, switching component 360, output component 365, controller 370, and/or the like) may duplicate the encrypted packet to create a plurality of encrypted packets that includes a first set of encrypted packets that is associated with the first receiving network device and a second set of encrypted packets that is to be associated with a second receiving network device, as described above.

As further shown in FIG. 6, process 600 may include modifying the second set of encrypted packets by replacing the first virtual destination address in the second set of the plurality of encrypted packets with a second virtual destination address that identifies a virtual tunnel endpoint of the second receiving network device (block 640). For example, the network device (e.g., using processor 310, memory 315, storage component 320, input component 325, output component 330, communication interface 335, input component 355, switching component 360, output component 365, controller 370, and/or the like) may modify the second set of encrypted packets by replacing the first virtual destination address in the second set of the plurality of encrypted packets with a second virtual destination address that identifies a virtual tunnel endpoint of the second receiving network device, as described above.

As further shown in FIG. 6, process 600 may include encapsulating, based on a tunneling protocol, the first set of encrypted packets and the second set of encrypted packets to create a plurality of encapsulated encrypted packets (block 650). For example, the network device (e.g., using processor 310, memory 315, storage component 320, input component 325, output component 330, communication interface 335, input component 355, switching component 360, output component 365, controller 370, and/or the like) may encapsulate, based on a tunneling protocol, the first set of encrypted packets and the second set of encrypted packets to create a plurality of encapsulated encrypted packets, as described above.

As further shown in FIG. 6, process 600 may include sending, based on the first virtual destination address and the second virtual destination address, individual encapsulated encrypted packets of the plurality of encapsulated encrypted packets to the first receiving network device or the second receiving network device (block 660). For example, the network device (e.g., using processor 310, memory 315, storage component 320, input component 325, output component 330, communication interface 335, input component 355, switching component 360, output component 365, controller 370, and/or the like) may send, based on the first virtual destination address and the second virtual destination address, individual encapsulated encrypted packets of the plurality of encapsulated encrypted packets to the first receiving network device or the second receiving network device, as described above.

Process 600 may include additional implementations, such as any single implementation or any combination of implementations described below and/or in connection with one or more other processes described elsewhere herein.

In a first implementation, sending the individual encapsulated encrypted packets includes sending, via individual designated tunnels of a first plurality of tunnels between the network device and the first receiving network device, a first set of encapsulated encrypted packets of the plurality of encapsulated encrypted packets based on the first set of encapsulated encrypted packets including the first virtual destination address; and sending, via individual designated tunnels of a second plurality of tunnels between the network device and the second receiving network device, a second set of encapsulated encrypted packets of the plurality of encapsulated encrypted packets based on the second set of encapsulated encrypted packets including the second virtual destination address.

In a second implementation, alone or in combination with the first implementation, encrypting the packet to create the encrypted packet includes encrypting, using an ESP protocol, the packet to create the encrypted packet, wherein the encrypted packet includes the outer IP header and an ESP header.

In a third implementation, alone or in combination with one or more of the first through second implementations, encrypting the packet to create the encrypted packet includes encrypting, using an ESP protocol, the packet to create the encrypted packet, wherein the encrypted packet includes an ESP timestamp that identifies timing of encrypting the packet.

In a fourth implementation, alone or in combination with one or more of the first through third implementations, the plurality of encapsulated encrypted packets is encapsulated according to a GRE tunneling protocol.

In a fifth implementation, alone or in combination with one or more of the first through fourth implementations, a quantity of the first set of encrypted packets corresponds to a quantity of a first plurality of tunnels that are configured between the network device and the first receiving network device, and a quantity of the second set of encrypted packets corresponds to a quantity of a second plurality of tunnels that are configured between the network device and the second receiving network device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   duplicating, by a device, an encrypted packet to create a plurality of encrypted packets that includes a first set of encrypted packets associated with a first receiving network device and a second set of encrypted packets associated with a second receiving network device;
   modifying, by the device, a first virtual destination address that identifies a first virtual tunnel endpoint of the first receiving network device to a second virtual destination address that identifies a second virtual tunnel endpoint of the second receiving network device in the second set of encrypted packets;
   encapsulating, by the device, the first set of encrypted packets to create a first set of encapsulated encrypted packets based on encapsulating a first encrypted probe packet with a Generic Routing Encapsulation (GRE) outer internet protocol (IP) header,
      wherein an encapsulated encrypted packet, of the first set of encapsulated encrypted packets, includes an encrypted inner packet encapsulated by an Encapsulating Security Payload (ESP) header;
   encapsulating, by the device, the second set of encrypted packets to create a second set of encapsulated encrypted packets;
   transmitting, by the device, a first individual encapsulated encrypted packet, of the first set of encapsulated encrypted packets, to the first receiving network device via a first tunnel; and
   transmitting, by the device, a second individual encapsulated encrypted packet, of the second set of encapsulated encrypted packets, to the second receiving network device via a second tunnel.

2. The method of claim 1, wherein duplicating the encrypted packet comprises:
   duplicating the encrypted packet based on determining a first number of tunnels associated with the first receiving network device.

3. The method of claim 1, wherein duplicating the encrypted packet comprises:
   duplicating the encrypted packet based on determining a second number of tunnels associated with the second receiving network device.

4. The method of claim 1, wherein modifying the first virtual destination address comprises:
   changing a destination address of an outer internet protocol header of a packet of the second set of encrypted packets.

5. The method of claim 1, wherein encapsulating the first set of encrypted packets comprises:
   encapsulating the first set of encrypted packets based on a tunneling protocol.

6. The method of claim 1, wherein the GRE outer IP header includes a source address that identifies a physical tunnel endpoint of a transmitting network device.

7. The method of claim 1, wherein duplicating the encrypted packet comprises:
   duplicating the encrypted packet based on a first number of tunnels connecting the first receiving network device to a group virtual private network and a second number of tunnels connecting the second receiving network device to the group virtual private network.

8. A device, comprising:
   one or more memories; and
   one or more processors to:
      duplicate an encrypted packet to create a plurality of encrypted packets that includes a first set of encrypted packets associated with a first receiving network device and a second set of encrypted packets associated with a second receiving network device;
      modify a first virtual destination address that identifies a first virtual tunnel endpoint of the first receiving network device to a second virtual destination address that identifies a second virtual tunnel endpoint of the second receiving network device in the second set of encrypted packets;
      encapsulate the first set of encrypted packets to create a first set of encapsulated encrypted packets based on encapsulating a first encrypted probe packet with a Generic Routing Encapsulation (GRE) outer internet protocol (IP) header,
         wherein an encapsulated encrypted packet, of the first set of encapsulated encrypted packets, includes an encrypted inner packet encapsulated by an Encapsulating Security Payload (ESP) header;
      encapsulate the second set of encrypted packets to create a second set of encapsulated encrypted packets;
      transmit a first individual encapsulated encrypted packet, of the first set of encapsulated encrypted packets, to the first receiving network device via a first tunnel; and
      transmit a second individual encapsulated encrypted packet, of the second set of encapsulated encrypted packets, to the second receiving network device via a second tunnel.

9. The device of claim 8, wherein the one or more processors, to duplicate the encrypted packet, are to:
   duplicate the encrypted packet based on determining a first number of tunnels associated with the first receiving network device.

10. The device of claim 8, wherein the one or more processors, to duplicate the encrypted packet, are to:

duplicate the encrypted packet based on determining a second number of tunnels associated with the second receiving network device.

11. The device of claim 8, wherein the one or more processors, to modify the first virtual destination address, are to:
change a destination address of an outer internet protocol header of a packet of the second set of encrypted packets.

12. The device of claim 8, wherein the one or more processors, to encapsulate the first set of encrypted packets, are to:
encapsulate the first set of encrypted packets based on a tunneling protocol.

13. The device of claim 8, wherein the GRE outer IP header includes a destination address that identifies a physical tunnel endpoint of a receiving network device.

14. The device of claim 8, wherein the one or more processors are further configured to:
determine a first number of tunnels connecting the first receiving network device to a group virtual private network; and
determine a second number of tunnels connecting the second receiving network device to the group virtual private network.

15. A non-transitory computer-readable medium storing a set of instructions, the set of instructions comprising:
one or more instructions that, when executed by one or more processors of a device, cause the device to:
duplicate an encrypted packet to create a plurality of encrypted packets that includes a first set of encrypted packets associated with a first receiving network device and a second set of encrypted packets associated with a second receiving network device;
modify a first virtual destination address that identifies a first virtual tunnel endpoint of the first receiving network device to a second virtual destination address that identifies a second virtual tunnel endpoint of the second receiving network device in the second set of encrypted packets;
encapsulate the first set of encrypted packets to create a first set of encapsulated encrypted packets based on encapsulating a first encrypted probe packet with a Generic Routing Encapsulation (GRE) outer internet protocol (IP) header,
wherein an encapsulated encrypted packet, of the first set of encapsulated encrypted packets, includes an encrypted inner packet encapsulated by an Encapsulating Security Payload (ESP) header;
encapsulate the second set of encrypted packets to create a second set of encapsulated encrypted packets;
transmit a first individual encapsulated encrypted packet, of the first set of encapsulated encrypted packets, to the first receiving network device via a first tunnel; and
transmit a second individual encapsulated encrypted packet, of the second set of encapsulated encrypted packets, to the second receiving network device via a second tunnel.

16. The non-transitory computer-readable medium of claim 15, wherein the one or more instructions, that cause the device to duplicate the encrypted packet, cause the device to:
duplicate the encrypted packet based on determining a first number of tunnels associated with the first receiving network device.

17. The non-transitory computer-readable medium of claim 15, wherein the one or more instructions, that cause the device to modify the first virtual destination address, cause the device to:
change a destination address of an outer internet protocol header of a packet of the second set of encrypted packets.

18. The non-transitory computer-readable medium of claim 15, wherein the one or more instructions, that cause the device to encapsulate the first set of encrypted packets, cause the device to:
encapsulate the first set of encrypted packets based on a tunneling protocol.

19. The non-transitory computer-readable medium of claim 15, wherein the one or more processors, that cause the device to encapsulate the second set of encrypted packets, cause the device to:
encapsulate each encrypted packet, of the second set of encrypted packets, using a tunneling protocol.

20. The non-transitory computer-readable medium of claim 15, wherein the GRE outer IP header includes a source address that identifies a physical tunnel endpoint of a transmitting network device or destination address that identifies a physical tunnel endpoint associated with a receiving network device.

* * * * *